US012771564B2

(12) United States Patent
Sipka et al.

(10) Patent No.: US 12,771,564 B2
(45) Date of Patent: Oct. 20, 2026

(54) METHOD AND SYSTEM FOR SECURE CLOUD DATA STORAGE AND RETRIEVAL

(71) Applicant: TRANSFERCHAIN AG, Baar (CH)

(72) Inventors: Berke Sipka, Sariyer (TR); Mert Baser, Istanbul (TR); Tuna Ozen, Ankara (TR); Mehmet Cagatay Tengiz, Izmir (TR); Abdulkadir Dilsiz, Istanbul (TR)

(73) Assignee: TRANSFERCHAIN AG, Baar (CH)

( * ) Notice: Subject to any disclaimer, the term of this patent is extended or adjusted under 35 U.S.C. 154(b) by 49 days.

(21) Appl. No.: 18/834,947

(22) PCT Filed: Feb. 1, 2023

(86) PCT No.: PCT/US2023/061768
§ 371 (c)(1),
(2) Date: Jul. 31, 2024

(87) PCT Pub. No.: WO2023/150565
PCT Pub. Date: Aug. 10, 2023

(65) Prior Publication Data

US 2025/0168024 A1 May 22, 2025

Related U.S. Application Data

(60) Provisional application No. 63/306,376, filed on Feb. 3, 2022.

(51) Int. Cl.
*H04L 9/00* (2022.01)
*H04L 9/08* (2006.01)
(Continued)

(52) U.S. Cl.
CPC .............. *H04L 9/50* (2022.05); *H04L 9/0825* (2013.01); *H04L 67/06* (2013.01); *H04L 67/1097* (2013.01)

(58) Field of Classification Search
CPC ......... H04L 9/50; H04L 9/0825; H04L 67/06; H04L 67/1097
See application file for complete search history.

(56) References Cited

U.S. PATENT DOCUMENTS 8,316,066 B1 * 11/2012 Srinivasan ............ G06F 16/134 707/828
2016/0196218 A1 * 7/2016 Kumar ................ G06F 11/1448 713/193

(Continued)

*Primary Examiner* — Viet D Vu
(74) *Attorney, Agent, or Firm* — Gottlieb, Rackman & Reisman, PC

(57) ABSTRACT

A method and system for distributed data storage of a file across a plurality of data storage nodes. A file on a user device is broken into chunks. Each chunk is sent to a remote server. The server stores a received chunk in a selected data storage node and returns chunk retrieval details indicating the address necessary to retrieve the stored chunk from the node. The user device saves the chunk retrieval details in an independent node verification network (INVN). To retrieve the file, the data stored in the INVN is retrieved and the chunk retrieval details for each chunk are sent to the server. The server retrieves chunks from the nodes at the addresses specified in received chunk retrieval details and returns the chunks to the user device. The chunks can then be reassembled to recreate the file.

24 Claims, 15 Drawing Sheets

(51) Int. Cl.

| | |
|---|---|
| ***H04L 67/06*** | (2022.01) |
| ***H04L 67/1097*** | (2022.01) |

(56) References Cited

U.S. PATENT DOCUMENTS

2016/0292429 A1* 10/2016 Manville ............... G06F 3/0641
2017/0161439 A1* 6/2017 Raduchel ............ H04W 12/033
2018/0373439 A1* 12/2018 Xu ...................... G06F 11/1464

* cited by examiner

METHOD AND SYSTEM FOR SECURE CLOUD DATA STORAGE AND RETRIEVAL

CROSS-REFERENCE TO RELATED APPLICATIONS

This application claims priority from U.S. Provisional Patent Application No. 63/306,376 filed Feb. 3, 2022, the entire contents of which is expressly incorporated by reference.

BACKGROUND

Recent advances in storage systems, messaging and file sharing applications, and cloud infrastructures have increased productivity and created value by connecting companies and individuals worldwide. Public, private, and hybrid cloud systems are becoming the de-facto storage systems for both small and large organizations. Utilizing cloud storage systems requires users to trust centralized service providers since they are giving them access to their data.

A typical cloud storage provider infrastructure has a central sever with a network facing interface, such as an API, through which users can send and receive data. On the back-end the server is connected to physical storage devices, such as banks of hard drives housed in a data center. File operations run the central server upload and retrieve user files from the datacenter. Some cloud providers encrypt user data before it is stored. Server-side encryption keys are also managed within the cloud provider's system. While there are some very large and well known cloud data service providers, such as Google, Oracle, and Amazon, there are also many smaller cloud systems, which may be set up for example by a single business or school.

Centralized storage by a cloud storage provider creates a number of security vulnerabilities. Login/logout operations run on centralized servers are subject to a single-point-of-failure. A centralized database with stored file information, including metadata and public encryption keys can also be vulnerable to hacking. The potential for leaks of private or commercial data is already a known issue. There have been several recent publicized data breaches in which many thousands (and in some cases even millions) of user IDs and related data were improperly accessed. Many companies, however, are reluctant to disclose system breaches or do so only belatedly. These breaches raise the prospect of a user's data being accessed and decrypted without their knowledge and consent. Even without a breach, personnel within the storage provider may also be able to access stored user information and files.

Advanced security measures are available. However, securing a system and maintaining this level of security is a high-cost operation for most individuals and small businesses. Intrusion detection systems, firewalls, and high-security modules are expensive devices and installing them or upgrading existing systems are often ignored until a costly attack occurs. Similarly, security experts and penetration tests are generally not affordable by the end users or small business. This results in poor security practices for data storage and transmission services that uses private clouds or local systems. Practices show that most users are unable to properly operate a cloud following the security guidelines.

Accordingly, there is a need for a cloud storage solution that provides increased data security even in the face of security vulnerabilities. There is a further need for a cloud storage solution in which user data is protected even in the case of a security breach.

SUMMARY

These and other issues are addressed by a method, system, and architecture for secure data storage and retrieval in which user data files are divided into chunks and stored by a server across a plurality of cloud storage providers, which can be separate and independent from each other, for example provided by unrelated companies. The data retrieval information for the file chunks, such as the IDs of the data storage nodes, timestamps, file name, file size, UUID, encryption information, sender and receiver public address and addresses at those nodes where chunks have been stored, is stored in an independent node verification network (INVN), e.g., a blockchain network, which is accessible by the user or other authorized party. Because data retrieval information, in the form of address and storage location data needed for retrieval of each block, is stored within an INVN, this information does not need to be retained over time by the server and so this data is not susceptible to a security breach at the server. Nor does it need to be stored by the user since it can be securely retrieved on demand from the INVN.

To recover the file, a user reads the file information from the blockchain. The data retrieval information for each file chunk is sent to the server which uses the information to read from the identified cloud storage system node a block of data at the identified address. The read data is returned to the user. When all the file chunks have been delivered to the user device, the chunks are assembled to recreate the stored file.

Using an INVN for storing the user data retrieval information prevents tampering with stored data by attackers and service providers. Because the file data chunks are distributed across separate data storage nodes which can be run by unrelated cloud storage systems, even a security breach at any given system would not allow a hacker to get access to the user's stored file since because the complete file is stored in a distributed manner and also due to lack of information at the cloud storage system which would associate any given stored data chunk with a user file.

The specific data storage nodes in which file chunks are stored can be assigned in advance at the server which then provides that assignment data to the user device. The user device can then send each chunk to the server along with data that tells the server which node to use for storage. The storage nodes can be selected by the server in advance or on demand and a storage node identifier returned to the user device along with the chunk storage address.

The file can be encrypted by the user before being chunked. Alternatively, or in addition, each chunk can be encrypted by the user before it is sent to the server for storage. The file retrieval data can also be encrypted prior to saving it in the INVN. The order which the chunks are sent by the user can differ from their sequential order mapped to the file. If a symmetric encryption, such as AES, is used on the user device, the key does not need to be shared by the user. A public/private key encryption system can also be employed. The user's private key can be only generated and used on the user's device so that it is secure. The public key can be used for encryption at the user device and for use in downstream encryption services.

Advantageously, in this embodiment, once a data storage process is complete, the server does not need to retain the retrieval data. Since neither the server nor the cloud storage providers have the raw data retrieval information, and any given cloud storage system has only fragments of the file stored, a data breach at any of these will not impact the security the file. Encryption of the file prior to storing provides further security since even if cloud providers collude to bring together all of the chunks, it would still be encrypted.

The present methods and systems can leverage existing architecture of commercially available data storage solutions and make these services available to end users while preserving full privacy and offering better security compared to the existing systems while further allowing implementation in a distributed and decentralized architecture. The present methods, systems, and architecture can also be set up in closed environments, such as an intranet to increase data security.

The methods can be implemented in software executed on the server in conjunction with a software application executed on the user device. In an embodiment, a particular user login protocol can be provided that is performed on the user device side during which a user's private key for use with the service can be generated.

In an embodiment, the server can associate one or more device IDs with a given account ID. When a chunk is provided to the server for storage or a request for a set of storage node assignments is made, the user device ID or account ID can be used by the server to look up any user preferences or restrictions for cloud storage provider characteristics. These preferences can then be applied in selecting from all available nodes the set of nodes to use for chunk storage in that instance.

Files can be transferred from one user to another by saving the file retrieval data in the INVN at an address that is also known to or can be determined by the recipient. For example, key pairs distributed to the sender and receiver can be used to generate a secure address usable by each party. The receiving party retrieves the file information from the INVN at the designated address and then it is used by their user device to have the server retrieve and return the data chunks for decryption and assembly to recreate the file.

DESCRIPTION OF THE DRAWINGS

Further features and advantages of the invention, as well as structure and operation of various implementations of the invention, are disclosed in detail below with references to the accompanying drawings in which.

FIG.

DETAILED DESCRIPTION

Figure 1:
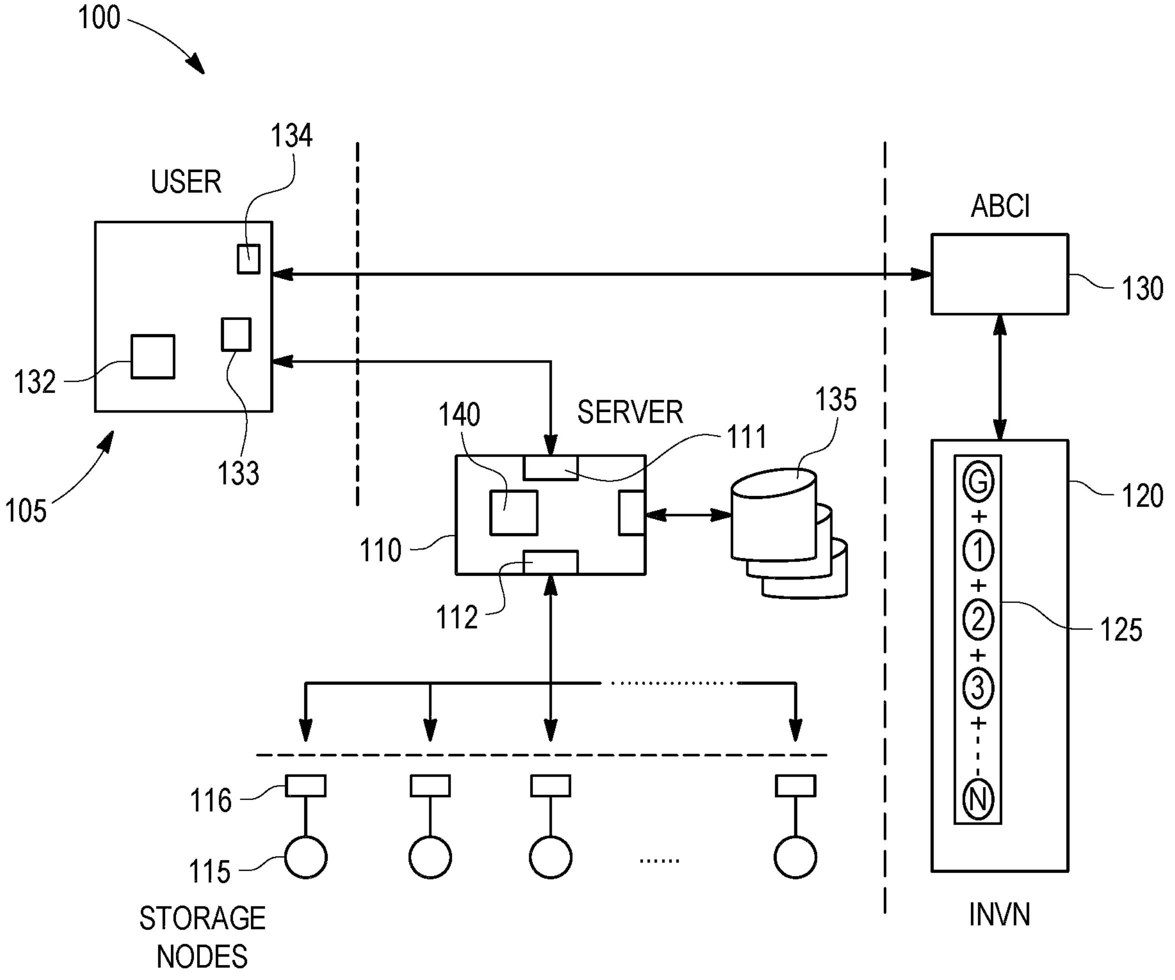
FIG. 1 is a high level network diagram of a system for secure cloud data storage and retrieval.

FIG. 1 is a high level diagram embodiment of a system 100 for providing secure cloud data storage and retrieval. A user device 105 can communicate with a server 110 and also with a separate independent node verification network (INVN) 120 through one or more networks. The INVN 120 maintains a distributed ledger or blockchain 125. Access to read from and write to the INVN can be through an application blockchain interface (ABCI) 130 which serves as the interface between the INVN replication engine and an external application to get and send requests to the blockchain for authentication and execution. In an embodiment, to maintain integrity of transactions the ABCI is the only service that can get and send requests to the blockchain. The server 110 can communicate with a plurality of data storage nodes 115, each of which can be operated by respective a cloud storage service. Cloud storage service providers can be of any type as long as they permit the server 110 to send data to a respective node 115 for storage and later send a request to retrieve the data from that node 115.

The network(s) connecting the user device 105 to the server 110, and INVN 120 and the server 110 with the storage nodes 115 can be the Internet, a WAN, LAN, cellular, or other network or combinations of networks. In a typical embodiment, communication between each of these components would include data sent over a global network such as the Internet. The network used for communication between various devices need not be the same. For example, communication between user device 105, server 110, and INVN 120 may be implemented within a private network, such as organization's physical network or a VPN, while server 110 communicates with storage nodes 115 through a public internet connection.

User device 105 can be a conventional computing device, such as a PC, smartphone, tablet, or other computing system with sufficient computing and network capabilities to execute software that performs the various functions disclosed herein. User device 105 comprises a microprocessor, memory, and a user interface. The memory can be used to store software that can be executed by the microprocessor and data. The software includes a User App 132 which is configured to implement user device functionality as described herein. The software will also conventionally include an operating system, such as Linux, OSX, or Windows, and application software. User device 105 also has one or more network interfaces allowing wired or wireless data communication, such as with the server 110 and the ABCI 130 and various support engines, such as a communication service engine 133 to support communication with the server 110 and an ACBI socket 134 for communication with the ABCI 130.

Server 110 can be a conventional computing device with sufficient processing capabilities and communication bandwidth to execute software that performs the various functions disclosed herein. Server 110 has a microprocessor, internal memory, and one or more wired or wireless network interfaces for communication with external devices, including various user devices 105 and the storage nodes 115. The memory can be used to store software that can be executed by the microprocessor and data. The software includes server application 140 that implements server functionality as described herein 110. The server software will also conventionally include an operating system and other application software. Additional supporting software or APIs may also be installed to facilitate implementation of the system 100, such as an API 111 through which a user device 105 can communicate and a data node communication engine 112 which allows communication with the various data storage nodes 115, and where each storage node 115 can have an associated API 116 with its own protocol and that allows external devices to access the node 115 in order to save, transmit or retrieve data.

Each data storage node can be assigned a corresponding ID. server can maintain a translation or lookup table or database that contains for each specified node ID the information needed for the node communication engine 112 to send data to and retrieve data from a given data storage node 115. In an embodiment, each data storage node is considered a 'slot' in which data can be stored. Each slot has an associated slot ID. The slot ID can be the same as the node IDs used by node communication engine 112 or the slot ID may need to be translated within the server 110, such as via lookup or other table, to convert a slot ID to the corresponding data storage node IDs.

Server 110 can also be programmed with software that provides additional functionality including access portals for users to manage their account and for administrators, such as corporate clients, to access system features such as management of the users, backup controls and account limits, analytics, invoicing, service management and customization of features. Server 110 can also be connected to one or more databases 135, which database storage 135 can be internal or external to the server 110 and either local to the server 110 or accessed via a network, such as LAN, WAN, or even maintained in cloud storage accessible through the Internet. Database 135 can be used to store user information, such as a user ID or e-mail address, registered device IDs, user preferences concerning data storage, and user public encryption keys. Other information can also be stored, such as whether an account is active or suspended (such as for non-payment of any membership fees or for exceeding data storage caps), and information to support various other conventional administration, service management and customization, user management and invoicing, and data analytics features.

The storage nodes 115 each comprise storage network systems that include one or more network servers. Each storage node 115 allows users to store and retrieve data on demand (and preferably without substantial delay given factors including file size and network congestion). In an embodiment, various data storage nodes 115 are operated independently from one another. Use of independent nodes allows security at one data storage node to be compromised without impacting other nodes. An example of independent data storage nodes are cloud storage systems run by different companies each with its own data center. Nodes can be physically located anywhere around the world. One measure of independence between two data storage nodes is when they cannot communicate with each other through back channels in the particular data service provider's own network but instead only can exchange information through each's respective standard user facing interfaces, such as APIs or other conventional communication paths such as email, and websites. The server 110 can connect to the various storage nodes 115 using the Internet, a private network, a VPN, LAN, WAN, or other means. The particular implementations of the data storage nodes are not fixed, as long as the necessary data load can be supported. In an embodiment, each storage node can be a commercially available cloud storage solution, such as AWS, Azure, Google Cloud, and Digital Ocean. In addition to a traditional storage node architecture, a storage node 115 for use with system 100 can work with its own back-end decentralized storage space (such as Web3/Layer 2 Arbitrum transaction). The way a particular data storage node 115 stores and retrieves data is not critical as long as server 110 is able to access such a system to save and retrieve data on demand and within any applicable performance criteria. Private storage solutions can also be used and a mixture of public and private storage nodes used as well.

While aspects of the disclosed systems and methods could be implemented using only a single storage node (by omitting the functionality that leverages using a plurality of storage nodes) increased security is provided with two or more storage nodes. In a particular embodiment, a minimum of four storage provider nodes are used as fewer can result in an impact to speed and performance in terms of data distribution, database communication, and security. Preferably, each of the four data storage nodes 115 is independent of the others.

Each data storage node 115 may have its own network address and interface API 116. The data node communication engine 112 in the server 110 can be configured to communicate with each different data node 115 as may be appropriate allowing the main application software 140 of the server 110 to more easily send or retrieve data from selected nodes 115.

As noted, the INVN 120 is a blockchain or other data storage system. In operation INVN 120 will be comprised of a decentralized network of computer nodes (which would not generally operate as a storage node 115) each of which supports a copy of the blockchain 125 according to the INVN protocols in place. Various ways of implementing an INVN and its associated blockchain 125 as well as the ABCI 130 functionality allowing other devices to read from and write to the blockchain 125 are known to those of ordinary skill in the art. The format and protocol of requests by the user device 105 to write data to or read data from the blockchain 125 can vary based on implementation of the ABCI 130. In some embodiments, the software in the user device 105 can include an interface app 131 to facilitate communication with the ABCI and/or INVN 120.

Figure 2A:
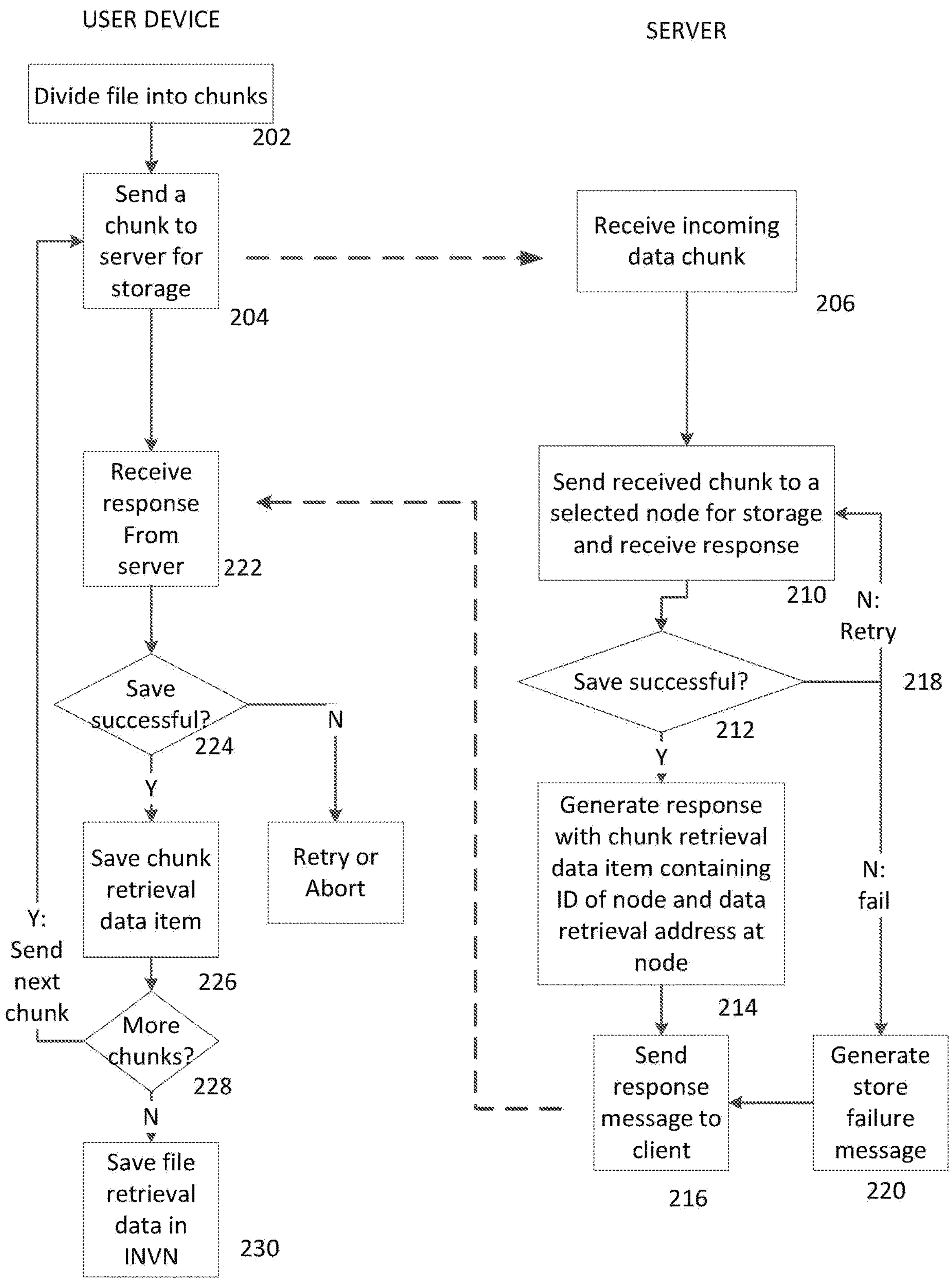
FIGS. 2A and 2B are high level flowcharts showing embodiments of a basic file storage process.

FIG. 2A is a high level flowchart showing a basic file storage process according to one embodiment. At the user device 105 the file at issue is divided into chunks (step 202). Each chunk can be a predefined size, such as 32 KB, or size can vary. Each chunk has a chunk ID that can be used to arrange the chunks into the proper sequence for reassembling the file. The file itself can be encrypted on the user device before chunking. In addition, or as an alternative each chunk can be encrypted.

Each chunk is subsequently sent from the user device 105 to the server 110 (step 204). In an embodiment, chunks are sent to the server 110 in an order that differs from the reassembly sequence, such as randomly. The chunk IDs do not need to be sequential and a mapping of chunk ID to the proper reassembly sequence can be at least temporarily stored on the user device 105. While sending a next chunk can wait until a current chunk has been successfully stored, in an embodiment a plurality of chunk storage requests to the server 110 can be outstanding simultaneously.

The server 110 receives a file chunk to be stored, such as via a chunk storage request sent from a user device 105. (Step 206) The chunk storage request can include information allowing identification of the user or the user device, such as a user ID or device ID. Such IDs can be used by the server 110 to validate that the account is valid and active, to retrieve any defined user preferences related, e.g., to storage, and for other purposes.

The server 110 can assign a specific data storage node 115 within which the chunk is to be stored. (Step 208) As shown in FIG. 1, server 110 has access to a plurality of different data storage nodes 115 and the assigned node is selected from among the data storage nodes 115 that are available to the server 110. The received chunk is then sent to a selected data storage node 115 for storage. (Step 210). The storage node can be selected on demand for each chunk or a node slots assignment for multiple chunks can be generated in advance as discussed further with respect to FIG. 2B below. Slot selection is also discussed further below.

If the data storage to the node 115 is successful (step 212), a data retrieval address for the stored data will be returned from that data storage node 115. A response message is generated by the server 110 that includes a chunk data retrieval item containing the information the server 110 needs to later retrieve that chunk from the appropriate node. Retrieval information comprises the data retrieval address for the node and can also include an identification of the data storage node 115 which was used if that information is not already known by the user device. The slot or node identification data can be integrated within the retrieval address or the address and slot/node data can be provided as separate data fields in the response message. If there is an error during the save (step 212) a retry sequence can be executed to attempt to store the chunk at the same or a different data storage node. (Step 218) With or without use of a retry sequence, if the save is not successful a store failure response message is generated. (Step 220). The response message with the chunk retrieval data item or an error message is returned to the user device 105 (step 216).

Returning to the operation on the user device 105, if the chunk save was successful (step 224) the chunk retrieval data item for the stored chunk is saved (step 226) and the process repeats until all of the chunks have been stored (step 228). If a save is unsuccessful, a retry sequence can be initiated. Depending on the amount of data redundancy in the chunks to be stored, a certain number of failed chunk stores may be accommodated and still allow for later successful retrieval. If a defined threshold for failed saves is exceed, the file save can be aborted. (Step 232).

After all of the chunks for the file have been processed, the chunk retrieval data provided by the server 110 for the stored chunks, chunk-to-slot assignment data as needed, along with any other information needed to recombine the chunks to recreate the file is then packaged together and stored by the user device 105 in the INVN (step 230). The storage address at the INVN blockchain 125 that is used for this storage can be generated on the user device 105 in a repeatable manner, such as a by applying an address generation function for the INVN. The address needed to retrieve the INVN stored data can be saved in the user device 105 or regenerated as needed. For example, the user's encryption keys and possible other data can be used to generate the storage address and regenerate the address for later data retrieval.

In an embodiment, once a chunk has been successfully stored by the server 110 and the chunk retrieval data items returned to the user device 105, the chunk itself and the chunk retrieval data items can be deleted by the server 110. As a result, only the user device 105 will have or have access to the information needed to retrieve any particular chunk of data. If a file storage attempt is aborted, the user device 105 can send chunk retrieval data items for the successfully saved chunks to the sever 110 indicating that these chunks should be deleted from the various data storage nodes 115 in which they have been stored.

Figure 2B:
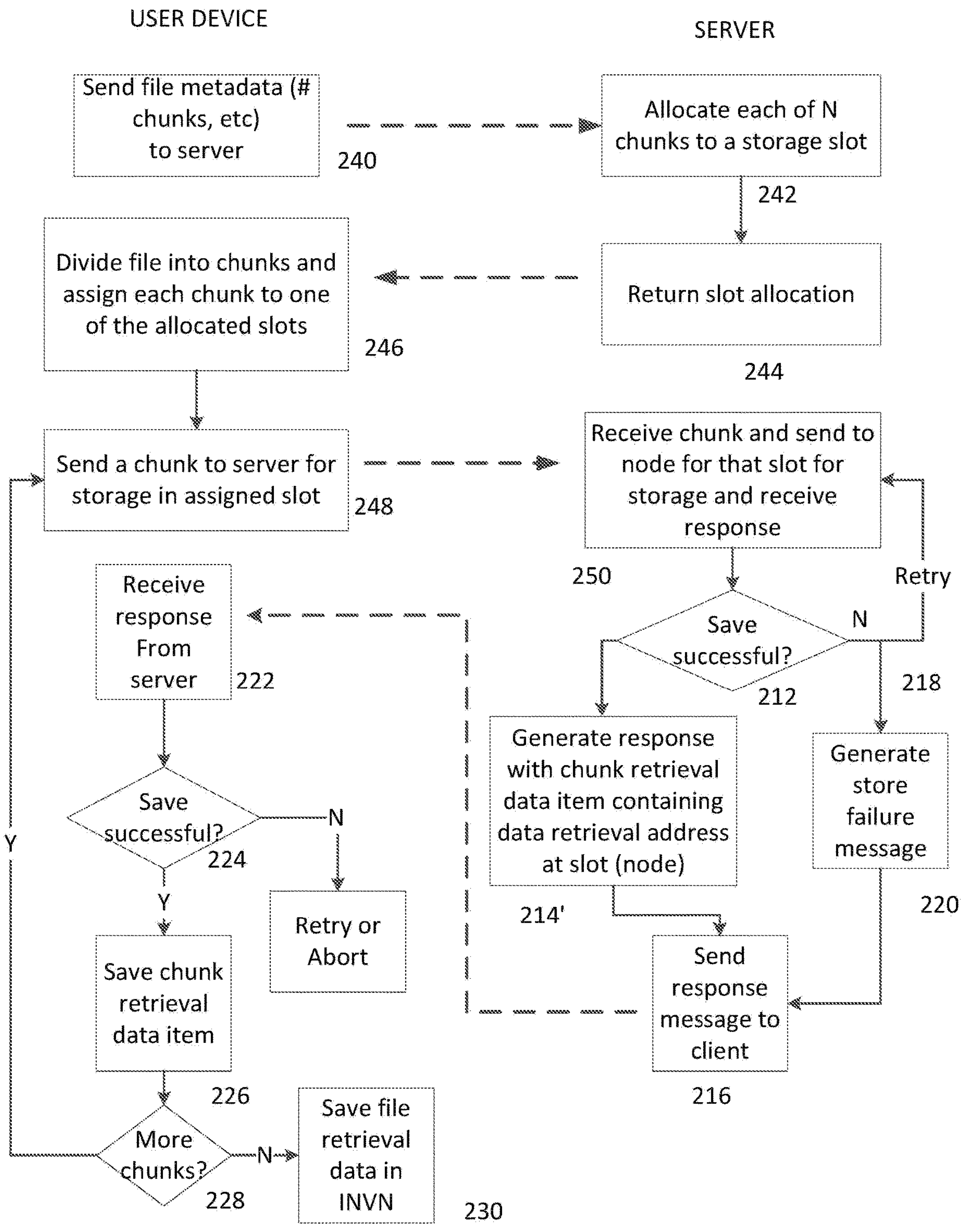

FIG. 2B is a high level flowchart of another embodiment of a basic file storage process. At the start of the file save process, the user device 105 will send metadata for the file to be stored to the server 110 (step 240). This metadata information can indicate the number of chunks N to be saved, such as the number of chunks there will be for the file and optionally chunk size, and other file data. When the server receives the initial file metadata, it allocates N slots for storage of the each of the expected N chunks, where each slot corresponds with a given data storage node 115. The slot allocation for storing N chunks of data is returned to the user device (step 244). If the file has not already been chunked it is divided into the N chunks. Each chunk is assigned to one of the allocated storage slots. (Step 246). The order in which the chunks are assigned to slots can be chosen randomly so that e.g., any of the file chunks could be assigned to the first listed slot and so on. The user device 105 then sends a chunk to the server 110 requesting that the chunk be stored in that assigned slot. (Step 248). On the server side, the chunk storage request is received and the chunk is sent to be stored at the data storage node 115 corresponding to the indicated slot. (Step 250). The remainder of the steps are the same as in FIG. 2A except that the chunk retrieval data item does not need to include an identification of the node the chunk was stored in since the user device already has the slot assignment information. (Step 214'). The user device can maintain the mapping between each chunk and the slot designated for storage.

In a variation of the embodiment of FIG. 2B, instead of providing the server 110 with the actual number of chunks for which slots are required, the user device 105 can periodically issue a request to receive a number M of slot assignments. M can be predefined, for example where each request returns 10 slots, or specified in the user device slot request. Chunks can then be sent to the server 110 to be stored, each in one of the assigned slots. If additional chunks remain to be stored, the user device 105 can request an additional set of slot assignments and the process repeated until all of the chunks have been stored. This variation allows the server to do some node allocation management but without the server having to be given the actual number of chunks that are in the file or even whether chunks sent using one set of slot assignments are part of the same file as chunks sent for a subsequent slot assignment set.

In a further variation of the embodiments of FIG. 2B, (not shown), the slot allocation could be determined in advance at the server 110 but not returned to the user device 105 at the start. The user device 105 can send (in a random or other order) each chunk for storage in turn without specifying a storage slot. Instead, the server would assign received chunks to one of the allocated slots for that file and on a successful save, the slot used for a given chunk would be returned to the user device 105 along with other chunk retrieval data. Allocating an entire files worth of N chunks in advance can be useful on the server side for load balancing and other purposes.

The selection of a specific data storage node 115 and/or slot allocation on the server 110 can be done randomly or in accordance with various criteria. User preferences or other requirements may limit the data storage nodes 115 available for use with a given user device 105 or user to a subset of the nodes 115 actually available to the server 110. Such a subset can be defined by filtering the total set of nodes 115 according to specified criteria associated with a user ID or criteria in other ways. For example, a user may want to use only data storage nodes 115 operated by companies that run their data centers with renewal energy or to restrict storage to nodes only within the United States to comply with restrictions on data export. Nodes operated by specific companies or in specified jurisdictions can be excluded to comply with, e.g., government imposed embargos or for other reasons.

It is also possible that based on user preferences, data storage node 115 availability, or other factors that only one or fewer than desired number data storage nodes 115 are available at a given time for use by the server 110 during a storage operation. In one embodiment, user preferences at the server or system thresholds set at the server can specify a minimum number of nodes, such as 5. If fewer than the minimum number of nodes are available when that user attempts to store a chunk or requests a slot allocation, the server 110 can return a failure message. In an alternative embodiment (with or without a minimum number of nodes specified in user preferences), when the number of nodes available is below a given threshold, such as less than 4 or less than 2, the server can allow chunk storage or perform slot allocation but also indicate to the user device 105 but that the number of available nodes is below the threshold. The decision on whether or not to proceed with the file storage process can be made on the user device 105. For example, a predefined threshold measure can be set in the user device 105, such as a number or percentage of chunks which are permitted for a given file to be stored using reduced node availability. If the threshold is exceeded, the user device can treat the storage of the file as having failed even if each chunk is saved or could be saved to the below-threshold number of data storage nodes 115 available. This allows the system 100 to account for times when the restricted number of data storage nodes 115 may be a temporary condition that would impact only a limited amount of the total chunks stored.

In a variation of this embodiment, suitable for an implementation where the client is not given the slot assignments up front, the response messages from the server 110 to the user device 105 can indicate as part of a storage response message the number of data storage nodes 115 available to the server 110 to choose from for a chunk storage. The user device 105 can then use this information to determine whether enough nodes have been used to meet the user's criteria. Other information could also be sent from the server 110 to the user device, 105, such as when the number of data storage nodes 115 available to the server 110 during the transaction is below a threshold due to user restrictions on which types of data storage nodes 115 can be used. Both options can be used together, wherein the server will deem a storage a failure if the number of available data storage nodes 115 is below a first threshold, such as less than 2 while the user device 105 operates using a higher threshold, such as 4 or a more sophisticated multi-chunk evaluation and may permit file storage if its threshold has not been passed.

In the various embodiments, the particular set of slots/nodes available for use in storing chunks sent by a given user device 105 can be predetermined or selected based on a variety of factors. A selection function can be used to select from a total set of X slots/nodes available a subset of Y nodes, where Y is less than X, that will be used for the transaction. Selection can be random in whole or part. Selection could also be based in whole or part on factors including user preferences, current and/or historic data reflecting usage of a specific node, cost of use, reliability measures, minimum and/or maximum size of data transfer accepted by each storage provider, geographic location of the storage node, node reliability metrics, and/or other factors.

Figure 3:
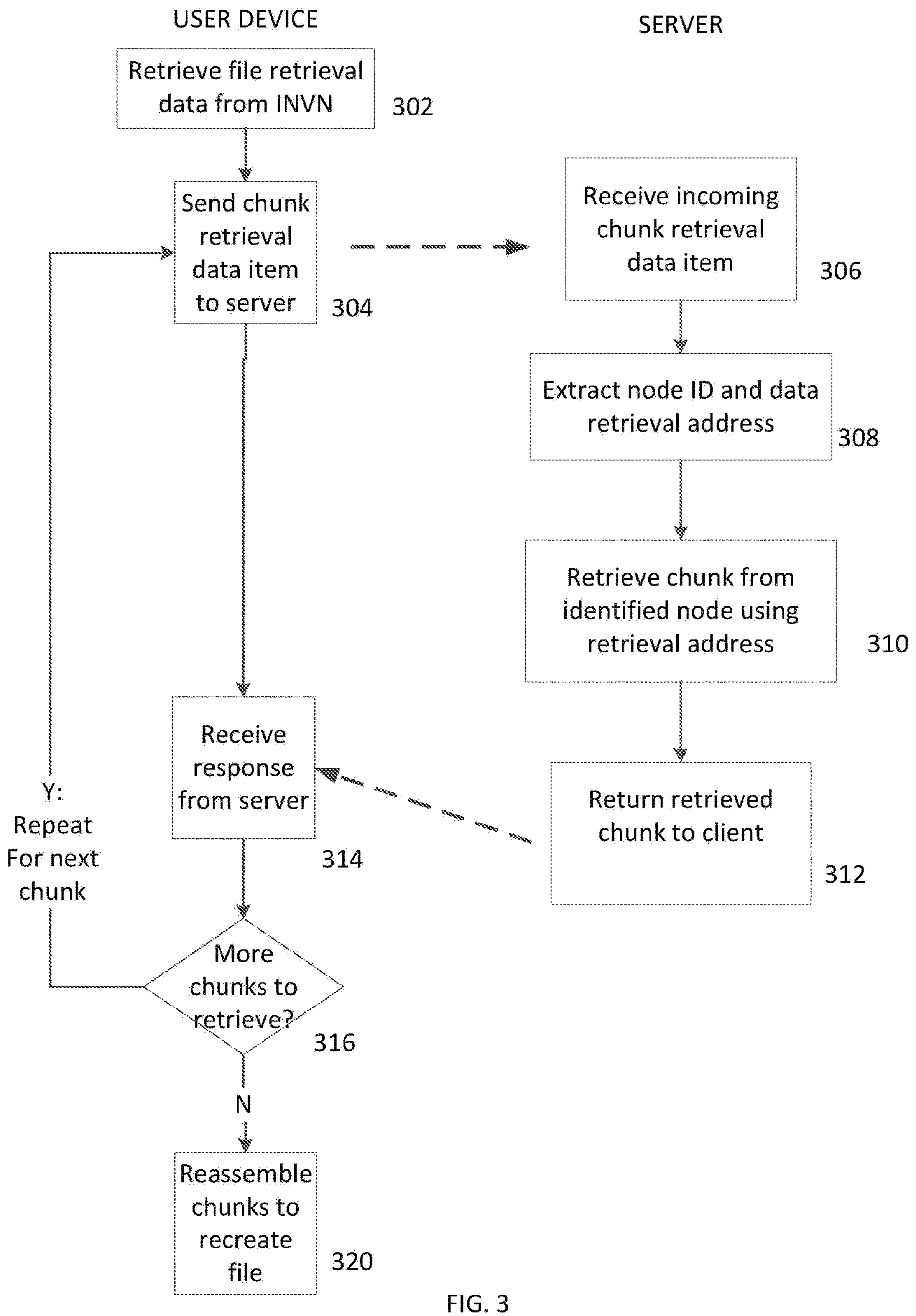
FIG. 3 is a high level flowchart showing a basic file retrieval process according to an embodiment.

FIG. 3 is a high level flowchart showing a basic file retrieval process according to an embodiment. Turning to FIG. 3, to retrieve a file stored according to the method of FIG. 2, first the INVN system is accessed by the user device 105 to get the previously saved file retrieval data, which data includes the chunk retrieval data items for the chunks of the saved file. (Step 302). The INVN data retrieval address may be previously stored on the user device 105, generated on the fly, such as through the use of address generation function which returns an address generated based on user specific key or other data, or the address can be stored and made available at the user device 105 in other ways.

The data retrieved from the INVN has the information needed to recover each of the chunks for the stored file. A data retrieval request that includes a chunk retrieval data item is sent to the server (step 304). Chunk retrieval data can comprise a slot or node identification and a retrieval address for the chunk from that storage area. On receiving this request (step 306), the server 110 determines from the chunk retrieval data item the data storage node 115 ID (which may be indirectly identified by a slot identifier) and the data retrieval address for the chunk (step 308). A request is sent by the server 110 to the identified data storage node 115 to retrieve the data stored at the specified address at that node. (Step 310). The retrieved chunk is returned from the node 115 to the server 110 and the server 110 then sends it to the user device 105 (Step 312). When the user device 105 receives this data it can store it locally and continue to issue chunk retrieval requests until all chunks have been received. (Step 316). The retrieved chunks are then reassembled into the correct sequence to recreate the stored file. Encrypted chunks can be decrypted by the user device 105 before combination into the file. If the combined file is encrypted, a decryption process can be applied after the chunks are combined.

Various redundancies can be built into the system so that if one data storage node 115 gets hacked or down, the system continues to work. On the server side, a zonal redundancy can be implemented during the storage process wherein the sever 110 is configured to store each chunk in more than one data storage node 115 and file retrieval data for both nodes is returned to the user device 105. Similarly, on the user device 105, the same chunk could be stored twice, each time in a different slot. When a subsequent attempt by the user device 105 to retrieve the chunk from one of the data storage nodes 115 fails, the user device 105 can reattempt retrieval using the second address. Alternatively both data retrieval addressees for the chunk can be sent to the server 110 as part of a chunk retrieval request. If a retrieval from one node fails, the server 110 can attempt retrieval from the other designated node and address. Of course, more than two redundant data storage nodes can be used in this process. If a given cloud storage provider supports its own zone redundant storage that can be enabled as well so that partial failures in a given cloud service provider node are not fatal. Most of the read failure cases are likely to be resolvable in this manner. In an embodiment, a reed Solomon or other error correction process is applied to the file data on the user device 105 before storing the chunks to allow recovery. This can allow the original file data to be recreated without requiring all of the data chunks to be retrieved. Reed Solomon and various other ECC processes are known to those of ordinary skill in the art.

Figure 4:
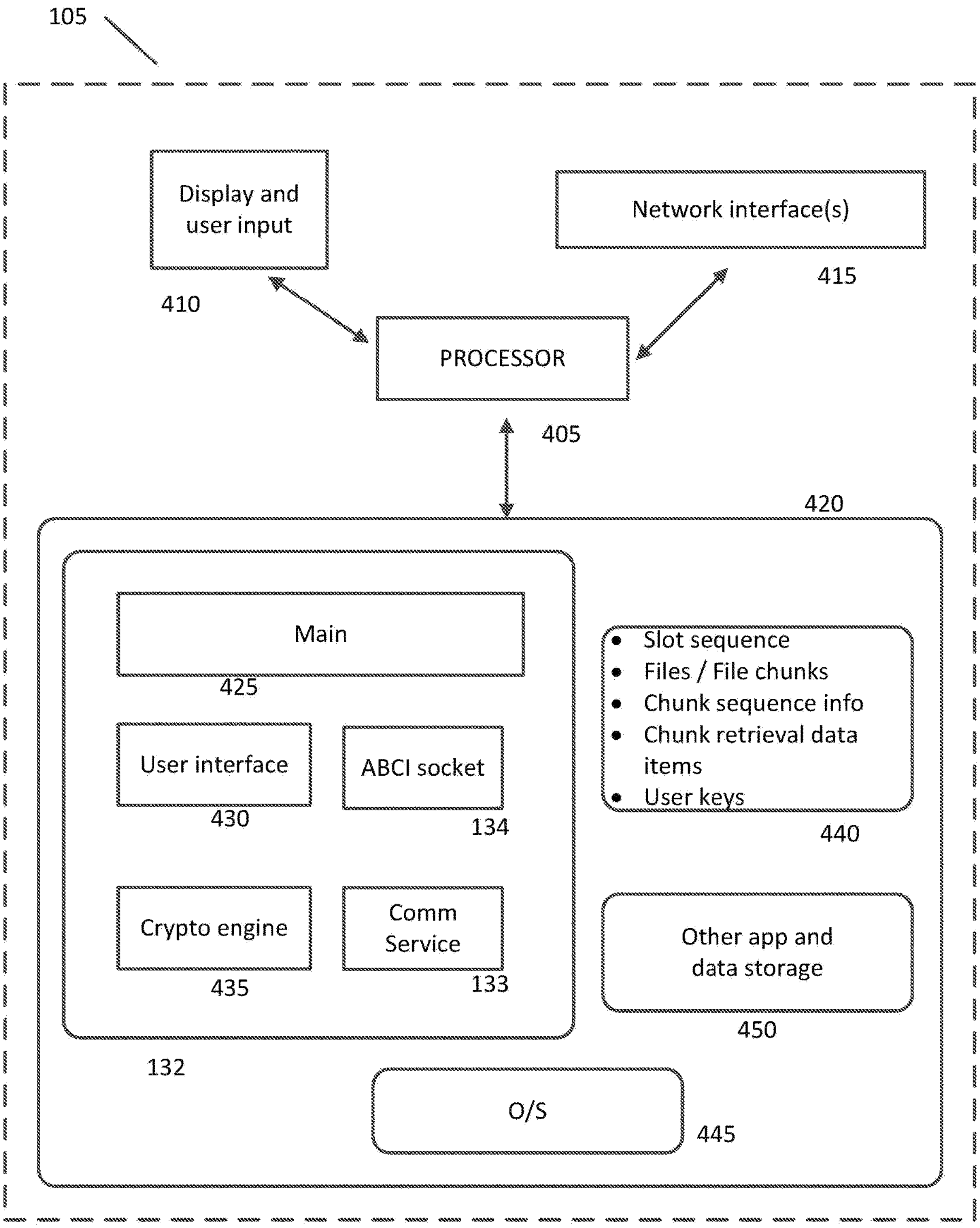
FIG. 4 is a high level block diagram of a user device.

FIG. 4. Is a high level block diagram of a user device 105. User device 105 comprises a processor 405, display and user input devices 410, and one or more network interfaces 415. The processor 405 is operative to execute software instructions in a computer memory 420. Memory 420 can also be used to store data. While memory 420 is shown as a single element, memory 420 can comprise separate storage areas, such as program storage and data storage, be implemented using various technologies that can be internal or external, such as onboard RAM and ROM, onboard or external flash memory, and other external storage devices, such as physical connected or networked hard drives.

Stored in the memory 420 is the user app 132. In an embodiment, user app 132 is divided into several software components including a main application engine 425 that implements the overall functionality of the user app 132. As previously noted a communication service engine 133 can be provided to support communication with the server 110, such by establishing secure communication channels and managing the protocols for sending and receiving messages with the server 110. ACBI socket 134 communicates with the ACBI 130 to send requests to store data in the INVN 120 blockchain 125 or read data from it. While the ACBI 130 and ACBI socket 134 are shown as separate components, depending on how the INVN 120 is implemented a separate ACBI socket 134 may not be required or the ACBI functionality can be implemented in the user device 105. The user app 132 can also include various other components, including a user interface engine 430 through which users can interact with the User app 132 to store and retrieve files, and a crypto engine 435 to support encoding and decoding features.

Memory 405 is also used to store various types of information utilized to implement the disclosed functionality. A data storage section 440 can be used by the user app 132 to store files and generated or received file chunks, chunk assembly sequence information, chunk retrieval data items, an allocated slot sequence, user encryption keys, such as public and private keys generated for use with the user app 132, and other relevant data. In conventional user devices, memory 420 could also include things such as operating system software and data 445 and storage 450 for various other application and data.

While the various components of the user app 132 are shown as separate modules or engines, the functionality can be organized within the software in other ways. Certain modules can have use outside the user app 132, such as the crypto engine 435 and so may be present as a service available on the user device separate from the user app 132.

Figure 5:
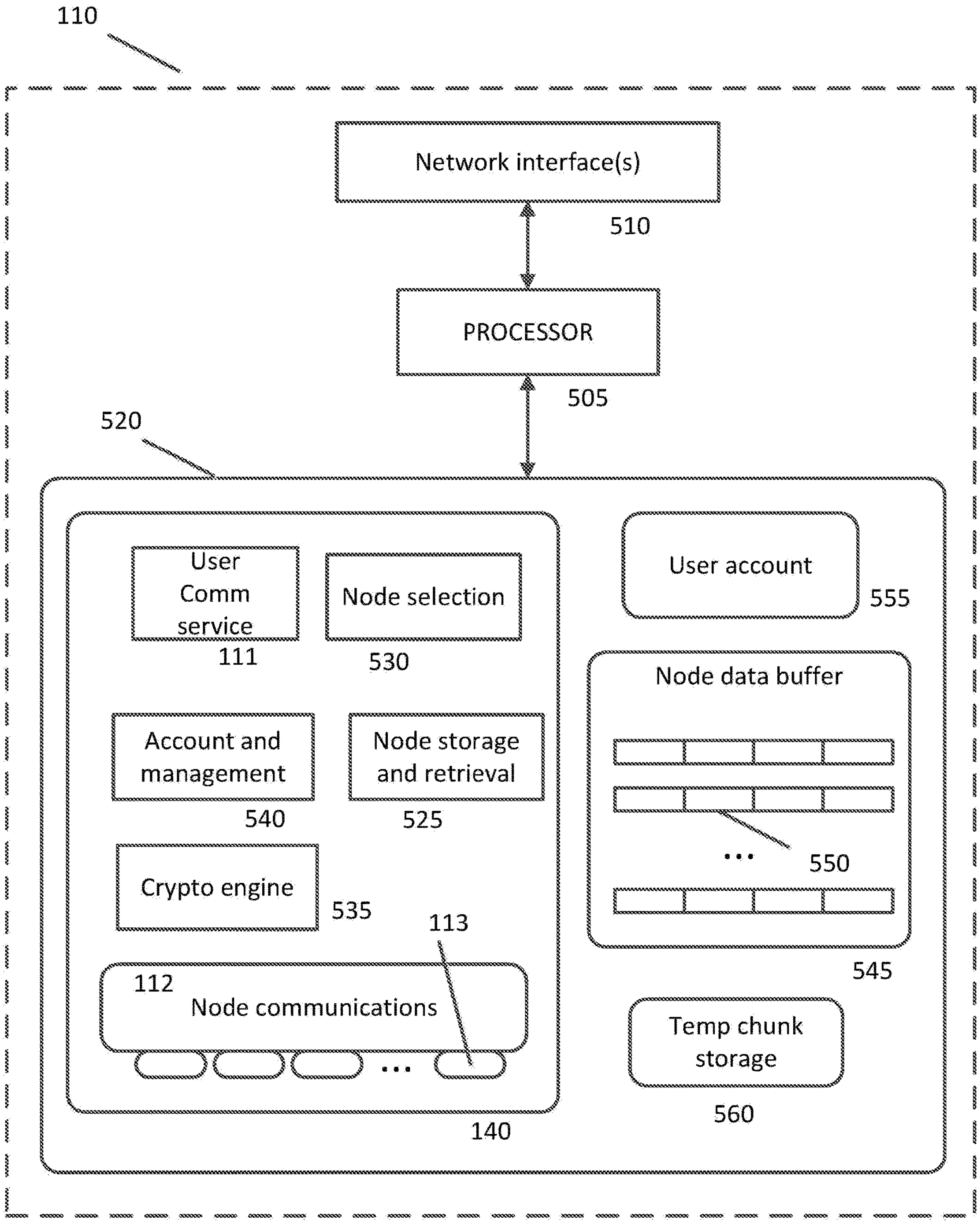
FIG. 5 is a high level block diagram of the server.

FIG. 5 is a high level block diagram of sever 110. Server 110 comprises a processor 505 and one or more network interfaces 510. The processor 505 is operative to execute software instructions in a computer memory 520. Memory 520 can also be used to store data. While memory 520 is shown as a single element, memory 520 can comprise separate storage areas, such as program storage and data storage, be implemented using various technologies that can be internal or external, such as onboard RAM and ROM, onboard or external flash memory, and other external storage devices, such as physical connected or networked hard drives. Likewise, database storage 135 can be maintained in whole or part internally or external to the server 110 as noted above.

Stored in the memory 505 is the server application 140. Server application 140 can be divided into several software components. A user communication service engine 111 provides an API through which a user device 105 can communicate with the server 110. The data node communication engine 112 supports the appropriate communication protocols to allow the server application 140 to send and receive messages to the various data storage nodes 115. Since each data storage node 115 may have a separate API 116 through which it is accessed, with its own corresponding access protocol, the node communication engine 112 can include a plurality of customized node interface modules 113 each providing the appropriate communication protocol for one or more specific data storage nodes. When main server software wants to communicate with a particular node, it can send one or more messages to the node communications engine 112 and identify the destination storage node. The node communications engine 112 operates to issue the request to designated node in the correct format. Likewise, messages and data that are sent from a data storage node 115 to the server 110 can be converted within node communications engine 112 and node interface modules 113 into an internally standard format that can be used by the server application 140.

The Node storage and retrieval engine 525 manages the overall execution process for a chunk store or retrieval request received from a user. A separate node selection engine 530 can be provided to identify which data storage nodes 115 are available for use in a given chunk storage process or slot assignment and can include functionality that will filter the data storage nodes 115 available to the server 110 to generate a subset of nodes 115 that meets specific criteria, such as criteria linked to the user or user device 105 from which the chunk storage request has been received. The node selection engine 530 can also generate slot allocations for file storage operations. If encryption functionality is used, an appropriate crypto engine 535 can be provided. In one example, a user can include a public key with their user account. This can be used to encrypt chunk retrieval data items and other information, such as slot assignments, that the server 110 returns to a user.

A node data buffer 545 stores data chunks that have been directed for storage at a given node until they have actually been stored. For example, each node can have a queue of chunks waiting to be stored and which are subsequently pushed to the designated data node.

A user account and system management engine 540 provides conventional user account configuration and management as well as supporting administrator functions. An account and management module 540 can also be configured to look up the user profile associated with the user device or user ID of an incoming message and return data indicating, e.g., whether the user or device is registered, is suspended, has reached a data cap, any storage node selection preferences, etc. At least some user account information can be stored in user account memory 555. This memory 555 can function as the entire user account database 135, as a cache of accounts implicated by recent transactions, and/or used for temporary storage of transaction specific and user account information needed for ongoing data storage or retrieval operations. A temporary chunk storage area 560 can also be provided for use during data storage and retrieval operations.

While the various components of the server application 140 are shown as separate modules or engines, the functionality can be organized within the software in other ways.

Figure 6A:
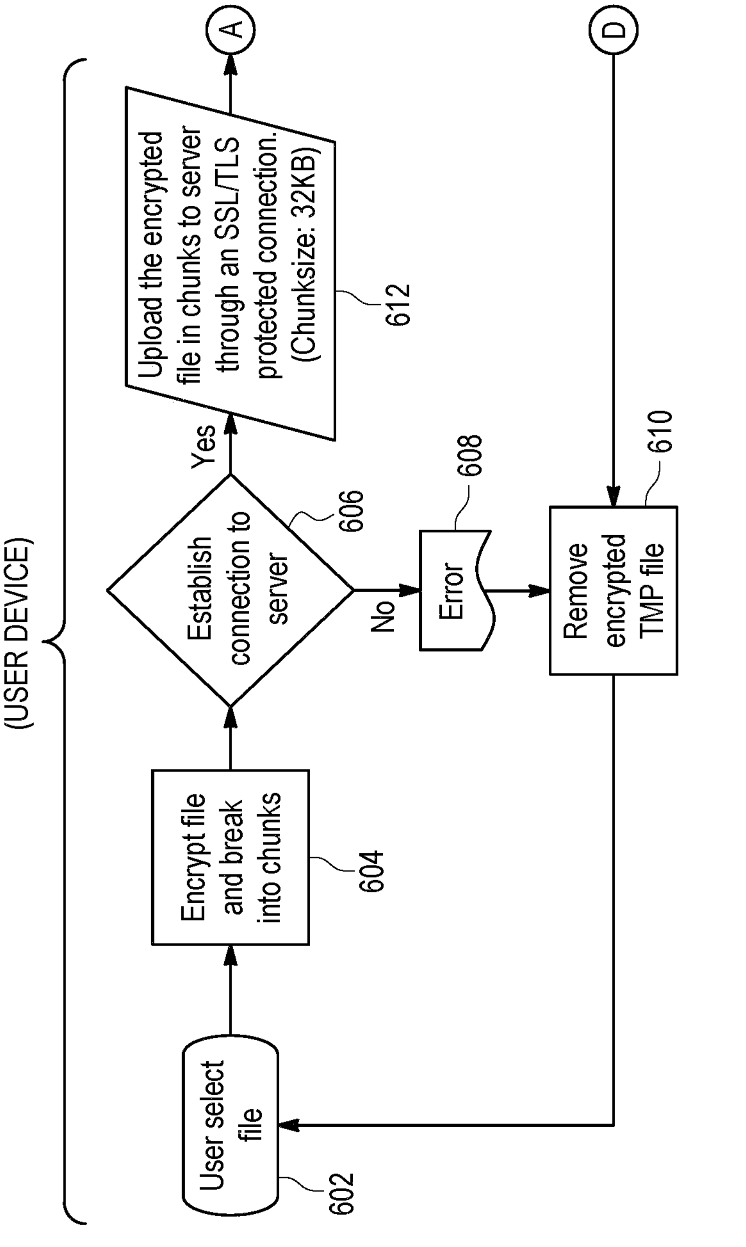
FIGS. 6A-6C are flow diagrams of a particular embodiment of a file storage and encryption process.
Figure 6B:
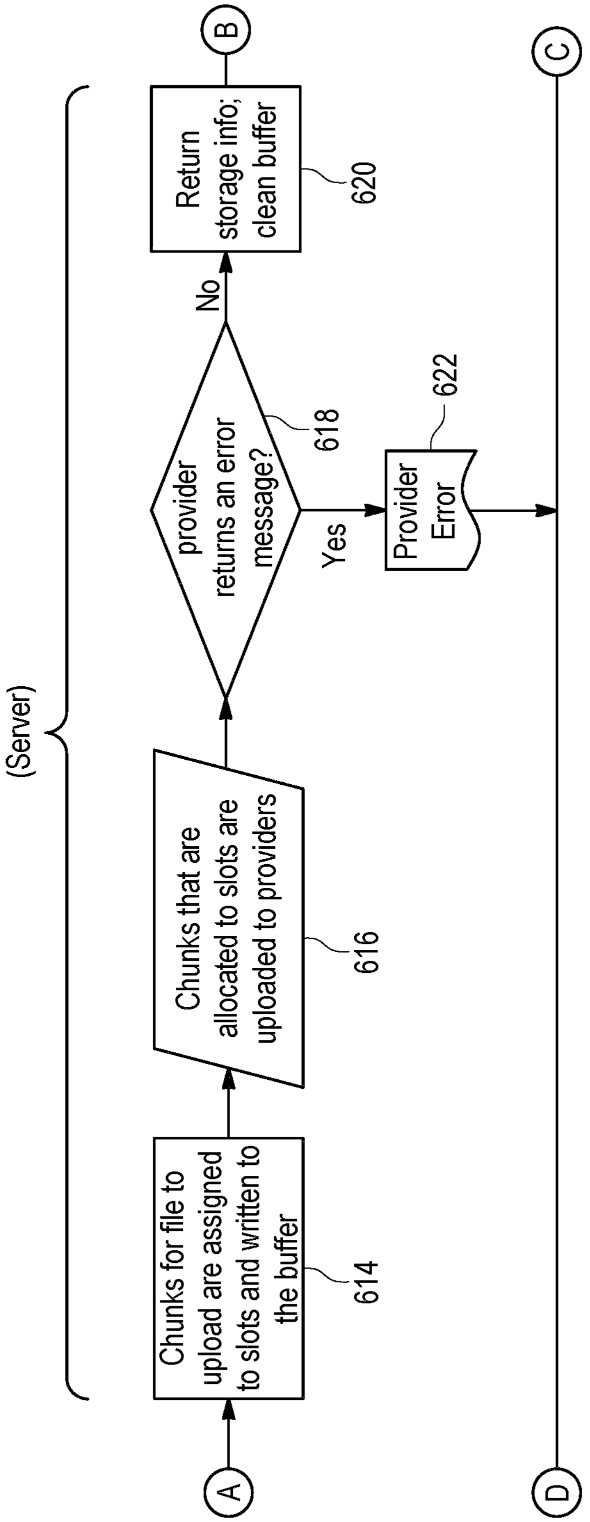
Figure 6C:
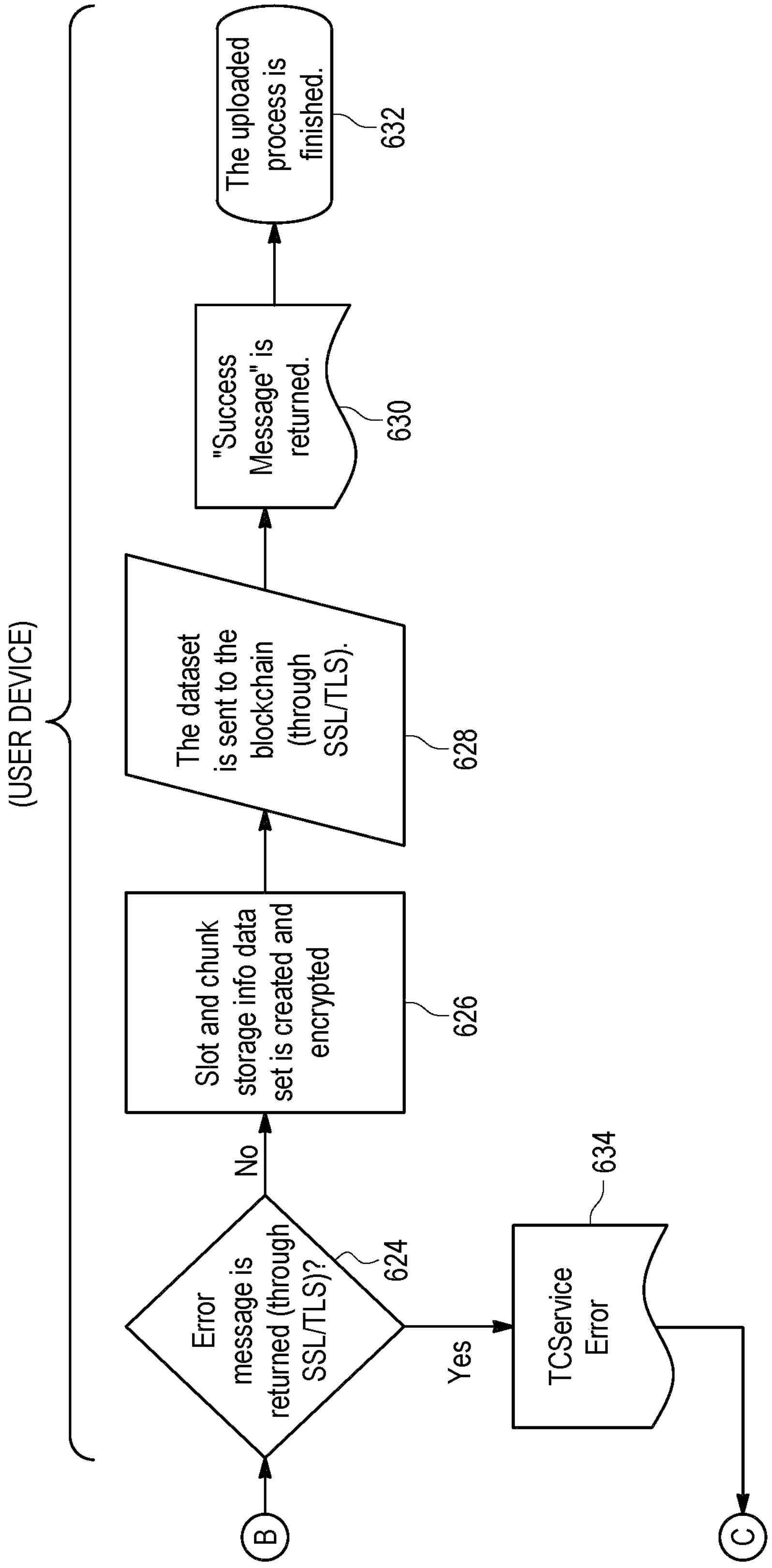

FIGS. 6A-6C are flow diagrams of steps performed in a particular embodiment of a file storage and encryption process. Reference is also made to FIGS. 2A and 2B. Turning to FIG. 6A, a file storage process is initiated on the user app 132 operating on a user device 105. The user logs in to the app 132 as may be necessary for security reasons and selects the file to be stored. (Step 602). The file is then encrypted and chunked. (Step 604) Various types of encryption schemes can be used and one or more encryption keys can be generated as part of the user registration process or at another time. A private/public key encryption scheme has particular advantages. Using such an encryption scheme, the file can be first encrypted with the user's public key and the encrypted file stored on the user's device as a temporary file. The private key should only be available on the local user device 105. In a particular embodiment, encryption is done via AES with SHA512 HMAC method with a random 32-byte key. (Byte keys can be augmented according to the systems performance on different devices with different computational powers) and the key is generated from a cryptographically secure random number generator.

In an embodiment, the chunks are each fixed to 32 KB in size to simplify chunk encryption and preservation of file integrity. However, different chunk sizes can be used and not all chunks need to be the same size. The last chunk can be padded to bring its size to the set chunk side as required. Conventional techniques can be used to maintain the file metadata information indicating the total number of chunks and the order they should be combined in a subsequent file reconstruction. Prior to transmission to the server 110 (and whether or not the file as a whole has been encrypted) individual chunks can also be encrypted by the user device 105. This encryption can use the same or a different public/private key pair as used for the file encryption.

If needed, a secure connection is established with the server 110 (step 606). Depending on the implementation embodiment, a set of slot assignments can also be received from the server 110 at this time as discussed above with respect to FIG. 2B. The chunks are then uploaded to the server via the network link. (Step 612). Chunks can be uploaded in an order that is different from how they need to be assembled to recreate the file. Chunk slot information can also be included if required.

After all chunks are successfully uploaded, the temporary file(s) on the user device can be deleted. If a connection to the server to initiate the file transfer cannot be established (step 606) or other issues occur, such as insufficient slot availability indicated by the server, an error message can be output to the user (step 608), the generated temp file and chunks deleted from storage (step 610), and the file storage process aborted.

Advantageously, no raw data needs to be circulated to or stored on the server 110. Instead, the server 110 can operate as a proxy-like intermediary service area that only processes encrypted parsed data. Where the data is encrypted and parsed in random order the server is not able to extract any meaningful data from the chunks. In an alternative embodiment, the encrypted file could be transferred to the server 110 as a whole and chunking of the file implemented on the server side. However, implementing chunking on the client side reduces the processing requirements of the server, lowering back-end operating costs, and also increasing data security.

Turning to FIG. 6B, the Server 110 operates on the uploaded file chunks to distribute them across the data storage nodes 115. Chunks for the file to upload are assigned to slots (if a specific slot is not already indicated in the chunk storage request) and the chunk is written to the buffer (step 614). Buffered chunks allocated to slots are then uploaded to the appropriate node corresponding to the assigned slot (step 616).

After a chunk has been successfully stored, the storage information is returned to the client and the chunk buffer can be cleaned. (Step 620). More specifically, a chunk retrieval data item with the chunk storage address at the utilized data storage node can be generated. If the user device does not already know which node or slot the chunk was stored in, that additional information is also included. Even if the user device 105 presumably knows the slot assigned to store a given chunk, this information can also be included to allow the user device to confirm that the chunk was stored in the expected slot/node or to indicate to the user device that a slot other than one designated in a chunk storage requested one was used by the server, e.g., due to a storage error.

If the server 110 knows the number of chunks for a given file from a user, the chunk retrieval data items from a file store operation can be accumulated on the server and returned to the client device after all chunks for a file have been successfully stored. Alternatively, the data can be returned on a chunk-by-chunk basis as each is successfully stored. Information can be encrypted prior to returning it to the user device. If a public key is available to the server for the user ID or device at issue, that key can be used to encrypt the retrieval information before it is sent.

After a chunk has been successfully stored, the chunk can also subsequently be deleted from the buffer. Purging the buffer can be deferred until an acknowledgement that the chunk retrieval data item has been successfully received at the user device 105. In an embodiment, the server can be configured to keep stored chunks for a given file until all chunks from the file have been successfully stored or until other conditions have been met, such as a designated period of time passed.

If there is an error storing a chunk to a given data storage node 115 (step 618), an error message can be returned to the user device 105 (step 622). In one embodiment, this message can lead to the user device 105 aborting the file save process. Before a storage error is sent, the storage process for the chunk can be retried by the server 110 at the same node or the system can attempt to store that chunk on a different node. For persistent errors on a given node, all unsaved chunks slotted to that error node can be reallocated to a different node. In some situations, particularly where the error may not be transient, chunks previously stored on that node can be stored again on a different node, and the node with errors removed from the set of available data storage nodes that can be used. If the server does not keep stored chunks temporarily in its buffer but knows the chunk IDs stored on the failed node, it can request that the user device resend those chunks IDs. Alternatively, when storage of a chunk fails all processes for that chunk can be canceled, and the user device asked to resend all of the chunks for the file. (The user device could also or alternatively be tasked with determining when a file storage has failed and should be retried in full.).

Turning to FIG. 6C, when the user device 105 receives notice of a successful upload (step 624) or otherwise determines itself that all chunks for a given file have been successfully stored, the chunk retrieval data items and other details concerning the file, such as the file name, chunk reassembly information, specific mnemonic passphrases and other meta data is packed and can be encrypted. (Step 626). This data is then written as transaction data to the ABCI 130 for inclusion in the blockchain (step 628). The transaction is broadcast for blockchain inclusion. Once the data is successfully added to the blockchain 125, the file upload process is complete. (Step 630).

Figure 7:
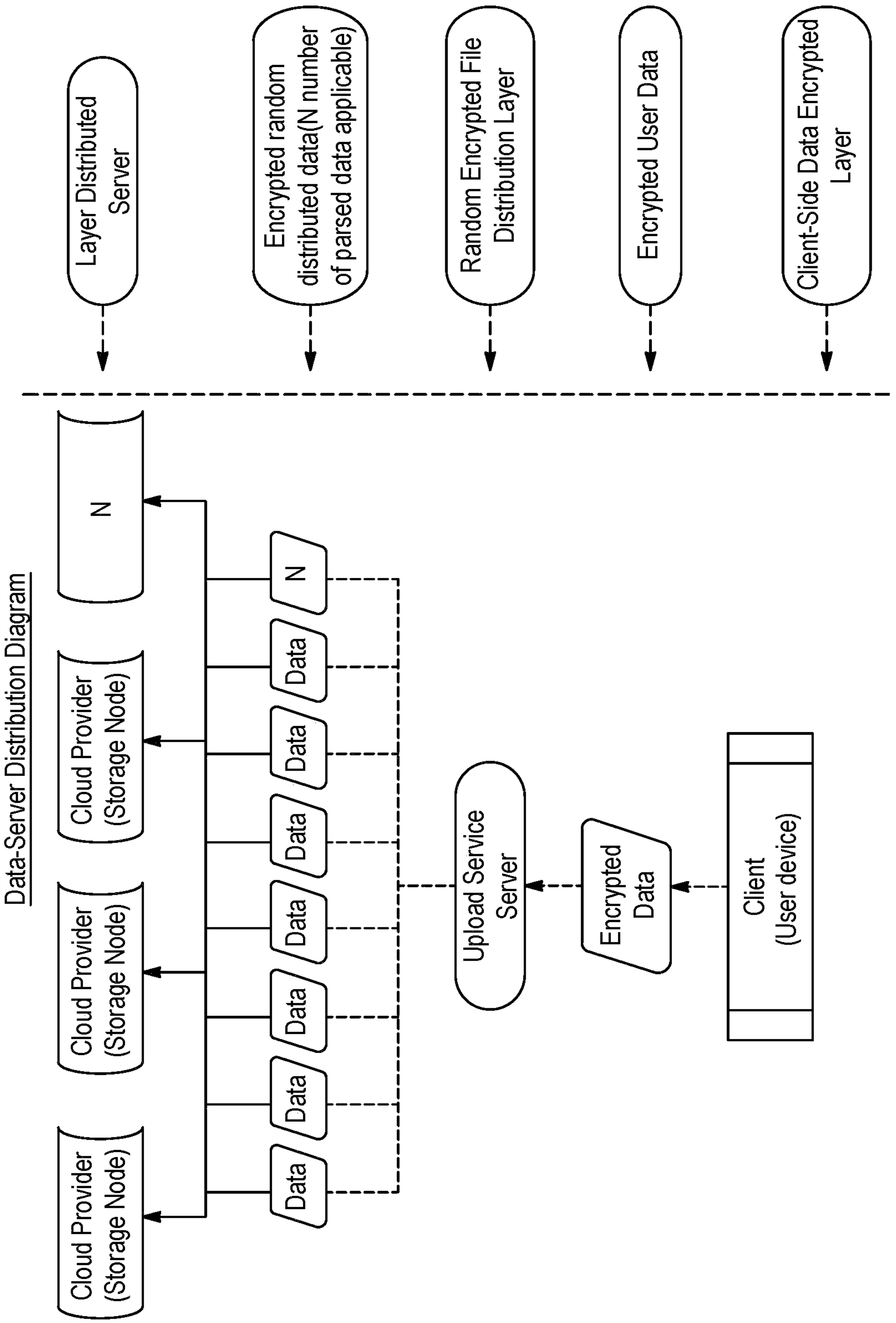
FIG. 7 shows a high-level sequence diagram of data distribution from the user app to the storage nodes.

FIG. 7 shows a high-level sequence diagram summarizing data distribution from the user app to the storage nodes.

Figure 8A:
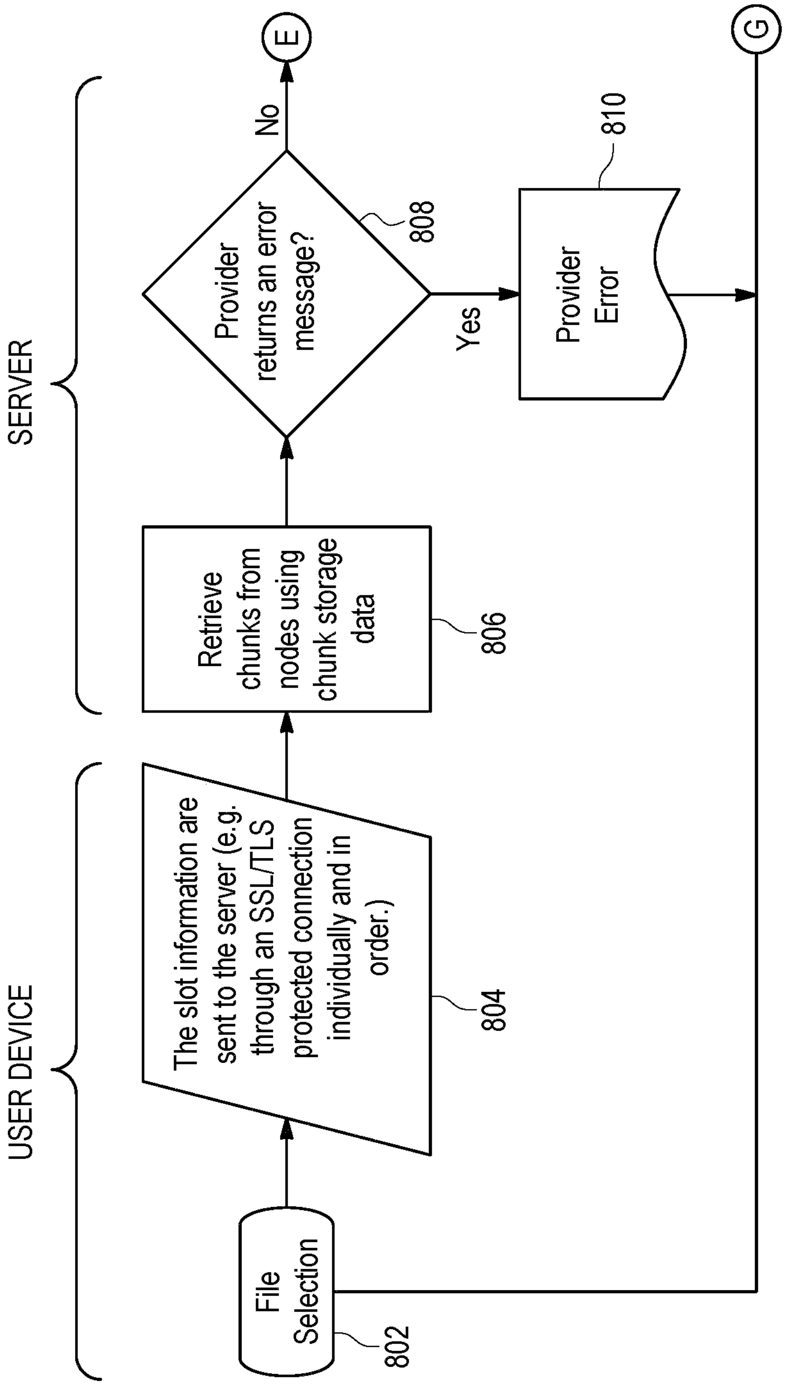
FIGS. 8A and 8B are flow diagrams of a particular embodiment of a file retrieval process.
Figure 8B:
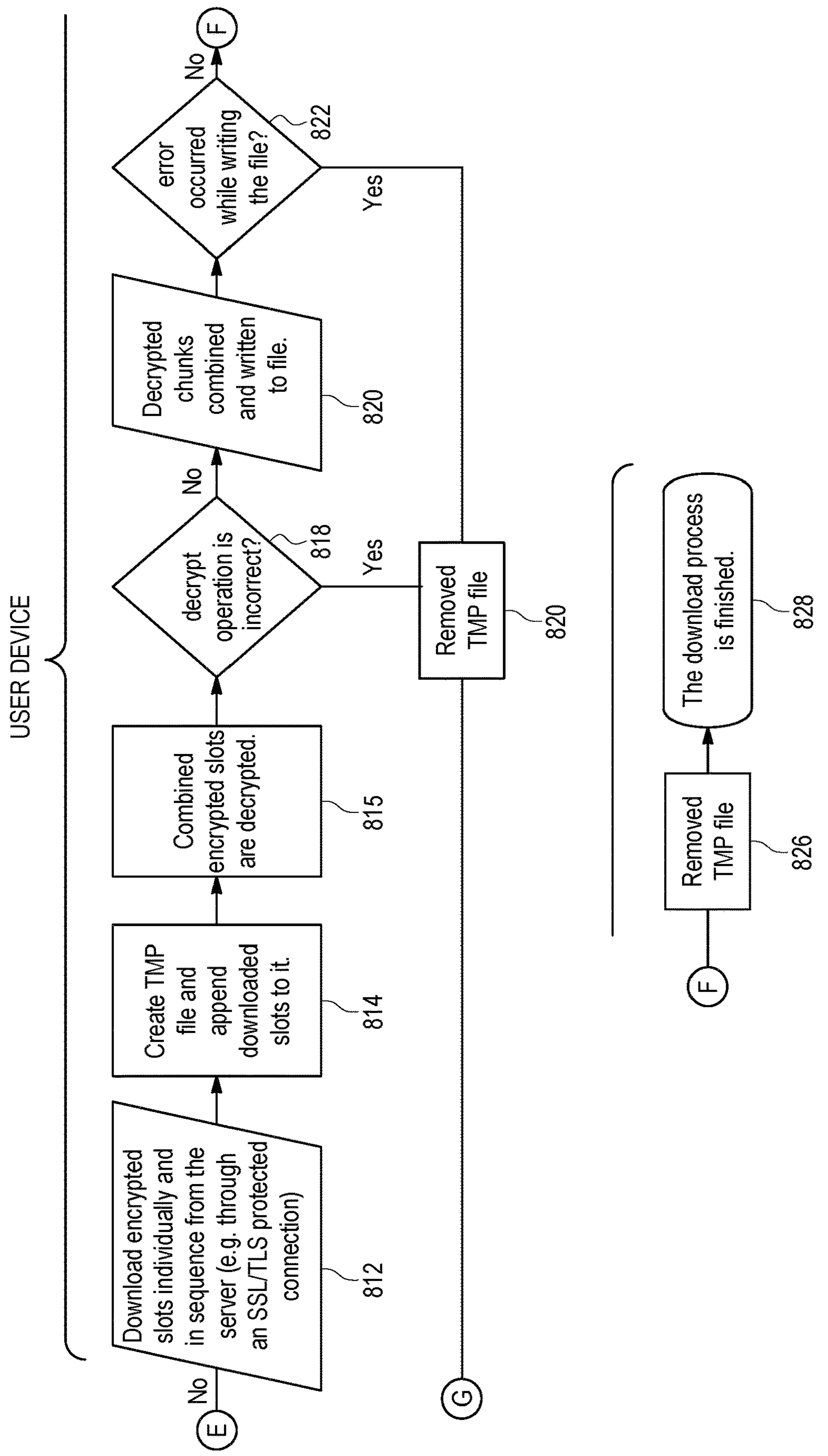

FIGS. 8A and 8B are flow diagrams of a particular embodiment of a file retrieval process. Turning to FIGS. 8A and 8B, to initiate a file retrieval, a user can select a file they have previously stored. (Step 802). The client application retrieves the file data from the blockchain (if not stored locally already). The retrieved information identifies the slots used to store each chunk (i.e., the storage node and a data address on that node) and data indicating which file chunk is stored in that slot. The user app 132 sends the slot and address data to the server 110 (step 804). The server 110 uses the slot and address information to retrieve the associated chunk from the indicated data storage node 115. (Step 806). If there is an error retrieving a chunk from a data storage node (step 808), the node service provider error can be noted to the user device 105 (step 810) which may abort the file retrieval process. As discussed above, if there are redundant storage addresses for a given chunk, those can be tried before retrieval is deemed a failure.

The encrypted slotted chunk data successfully retrieved by the server 110 is returned to the user device 105. (Step 812). Various ways to return the data to the user device can be used. The user device 105 can download the data after receiving an indication of successful retrieval, the server 110 can push chunk data to the user device 105 when data is available, or other methods used.

Chunk data coming into the user device is stored in one or more temporary files. (Step 815). If needed, the chunks are decrypted (step 815). Assuming decryption is successful (step 818) the decrypted chunks are combined and saved to recreate the original file. (Step 820). Because the user app 132 will know the order in which the chunks should be combined to recreate the file, for simplicity retrieval can be requested in the recombination order and retrieved chunks decrypted and appended to a temporary file on the file. Data retrieval requests can be sent to the server sequentially or some or all requests for the file sent as a batch. Having multiple requests outstanding together may allow the server to group data retrieval requests various nodes to improve performance. After the file has been successfully recreated, remaining temporary files can be deleted (step 826) and the file download process concluded (step 828). If there is an error during the chunk decryption process or while the decrypted chunks are being combined and written to recreate the file (steps 818, 822), the error can be noted and temporary files deleted as appropriate (824). Retry and recovery processes can be attempted first.

In addition to allowing for the secure storage and later retrieval of files by one party, the present methods and systems can also be used to securely transfer a file from one party to another by saving the file and then transferring to the designated recipient the information needed for them to eventually retrieve it via the server. The process is similar to a single user device operating to save and retrieving a file and so reference is to FIGS. 2A, 2B and 6A-6C which describe that.

For file transfer, in addition to selecting the file to be saved, the transferring party also identifies one or more recipients to receive that file. The file to be transferred is chunked and then uploaded from the user device 105 to the server 110 in substantially the same way as performed if the user merely wanted to store the file for their own later retrieval. The manner and/or keys used for encryption can vary, however, since data encrypted by the sending party will need to be unencrypted by the recipient. Various techniques known to those of skill in the art for generating and transferring encryption keys from the sender to the recipient can be used.

When the file storage process has been successfully completed, the file retrieval data is made available to the designed file recipients, such as by publishing data to a blockchain at a blockchain data address that is known or can be generated by both parties. As with the file data, the data stored in the blockchain can also be encrypted in a way that allows decryption by the receiving party. The receiving party can then download the transferred file by reading the blockchain data and continuing with the file retrieval process as outlined, e.g., in FIGS. 3 and FIGS. 8A-8B.

In an embodiment, each user of the system, including users wishing to send or receive files, are assigned a unique ID. A different public address can be generated for a user for each new transaction, unless the user dictates otherwise, such as by appropriate user configuration settings, that the system should use an existing address.

For security purposes it is expected (but not required) that data encryption will be done at various stages of file storage and transfer process. To protect data in transit, entities can encrypt their sensitive data before moving to the communication channel, which itself can utilize encrypted connections (e.g., SSL/TLS, VPN). Keys needed in connection with a user encrypting data for their own purposes and in cases where encrypted data is transferred to a third party who then needs to decode it. Encryption algorithms such as AES-CTR and AES-GCM are well suited to protect data, with CTR mode used for data in transit and GCM mode used for data 'at rest' within a computer system.

In a particular method for generating user keys, a user will set up an account to use for the system 100 and provide, e.g., an e-mail address and password. The user can be assigned a mnemonic, such as a randomly selected set of words and arranged in a random order. As an example, a set of 24 words can be selected at random from a master list of words, such as the 2048 words in the Bitcoin Improvement Proposal 39. The mnemonic is used to compute an encryption key for the user by applying a password-based key derivation function, such as PBKDF2. A seed can then be generated by encoding the password using the key: E.g., K=PBKDF2(mnemonic-words), seed=Enc_K (password).

In an embodiment, the keys for decryption are maintained on the client user side on the user device 105 and do not need to be stored anywhere else. If a user has saved a file and wants to retrieve it using a different device the relevant keys need to be transferred to the new device. Various methods key transfer can be used. In an embodiment, the mnemonic generated during the account set up process can be used. The user will download the app 135 onto the new device, enter their account username, password, and the mnemonic key. The account name, password and mnemonic are used to recreate the user key and seed data. In addition, and as noted above, the user's private key can also be used to generate the address on the INVN blockchain where stored file information is saved.

When transferring a file saved by one user to another, a key exchange process between the entities may be needed so that both can store/read the file data from the INVN and decrypt the data as needed.

In an embodiment, a given address for use in system 100 contains two public keys—a signature public key used for signing a transaction in order to prove message's originating source's authenticity, and an Encryption public key for decrypting the body of the transaction which is encrypted by sender using recipient's public key. A user's address for use with system 100 can be defined as TC Address=Signature Public Key (SPK)+Encrypt Public Key (EPK). Both public keys are derived from the same seed which is generated from a cryptographically secure random number generator. Conventional random number generators known to those of skill in the art, such as the 'secrets' module, can be used.

An elliptic curve encryption can be used. The elliptic curve used for the underlying proxy re-encryption scheme cryptosystem should generate a group of prime order, since the operations need to compute inverses modulo the order of this group. In an embodiment of the underlying setting of the proxy re-encryption scheme, the secp256k1 curve can be used since it fulfills this latter requirement and is widely used in the blockchain ecosystem ((An embodiment could be found at FIG. 11 (3.1.6. THRESHOLD PROXY RE-ENCRYPTION SCHEME (CRYPTOGRAPHICALLY SECURED DATA SHARING))).

The public key address in INVN used for the file exchange can be defined as the first 20-bytes of the SHA512 hash of the raw 64-byte public key: address=SHA512 (pubkey) [:20].

Figure 9:
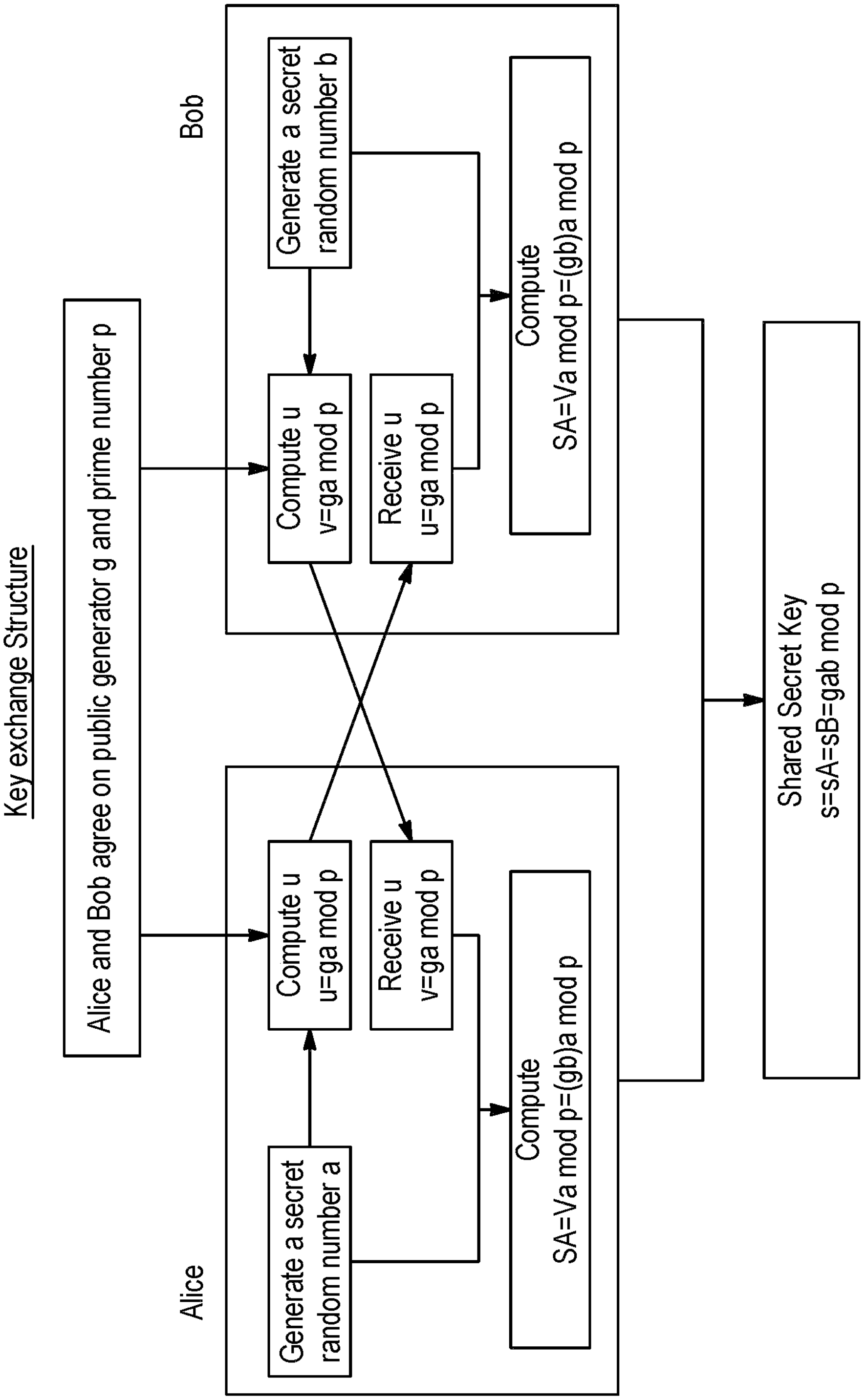
FIG. 9 is an illustration of a key exchange methodology.

FIG. 9 is an illustration of a particular key exchange methodology which also includes an improved method for addressed generation that can be used.

Figure 10:
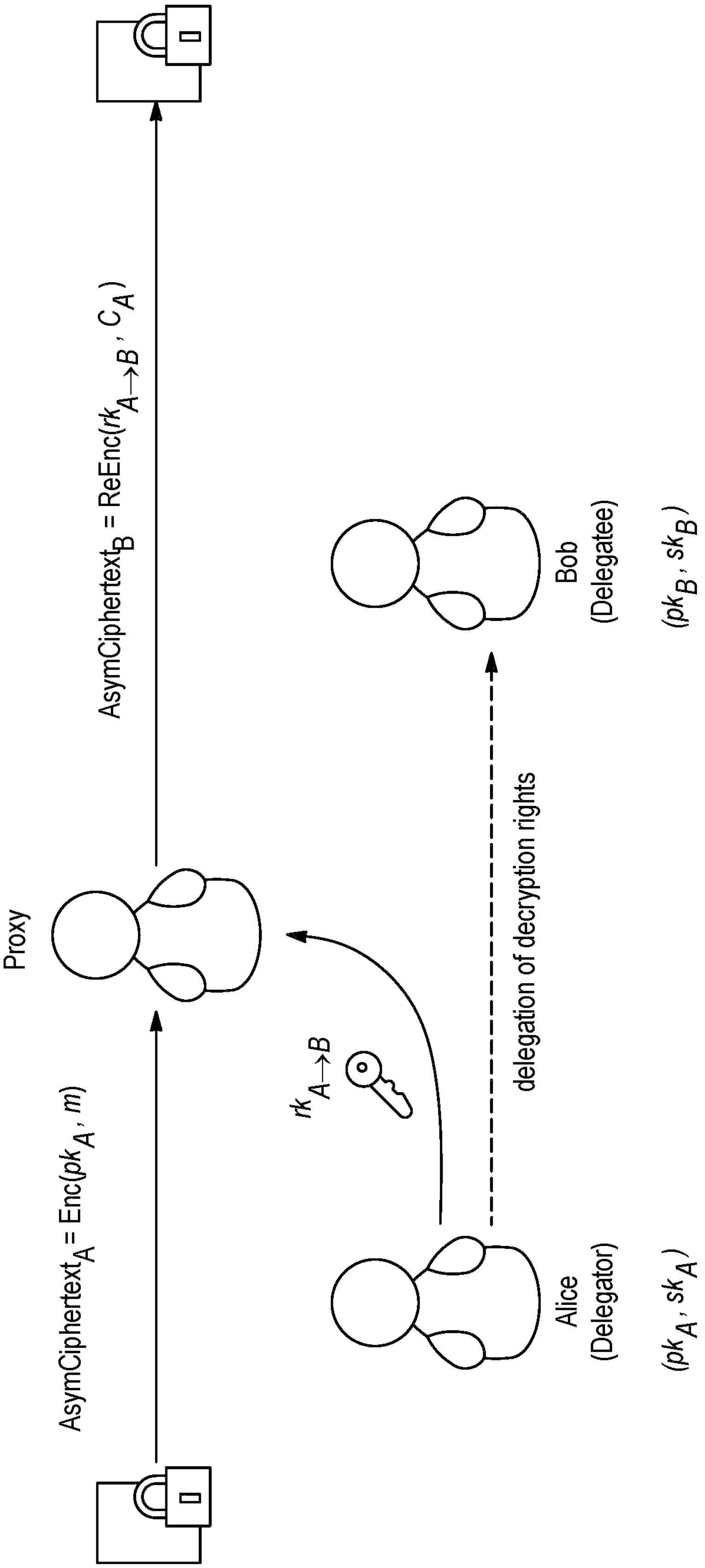
FIG. 10 is an illustration of entities and interactions in a proxy re-encryption scheme.
Figure 11:
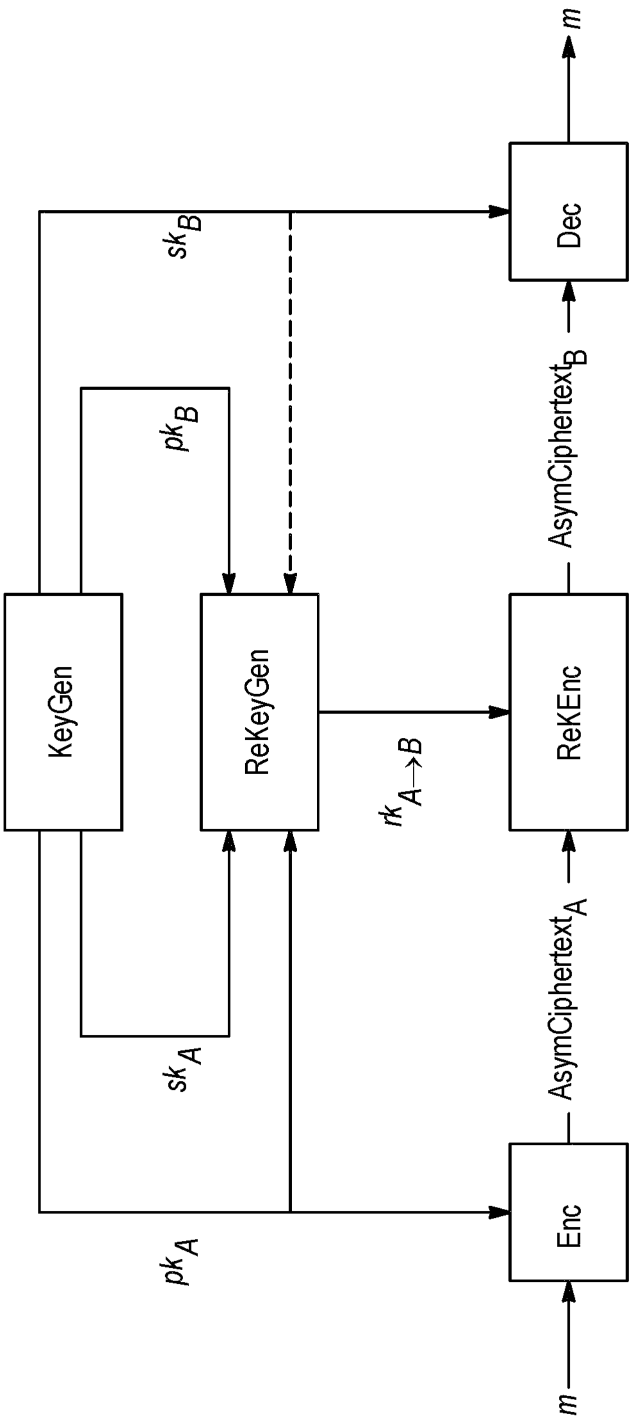
FIG. 11 is a high-level process for re-encryption and delegation.

Addressing more specifically a threshold proxy re-encryption scheme for use in an embodiment, this scheme provides for a key exchange allowing a secure way for multiple parties work on a data piece without compromising their secret keys preserves the ability of the data to be read on a specific server or database. In other words, Proxy re-encryption is a type of asymmetric encryption scheme that allows a proxy entity to transform ciphertexts from one public key to another, without learning anything about the underlying message. FIG. 10 is an illustration of entities and interactions in a proxy re-encryption scheme. FIG. 11 is a high-level process for re-encryption and delegation can include the following steps. With reference to FIGS. 10 and 11:

Alice the data owner delegates her decryption rights using proxy re-encryption. Assume that she has her public and private key pair ($pk_A$, $sk_A$) and has a ciphertext $$\text{AsymCiphertext}_A=\text{AsymEncrypt}_{pk_A}(M)$$

Bob is the Receiver-Delagetee. Alice would like to delegate access to the message M to Bob who has the key pair ($pk_B$,$sk_B$).

Alice creates a re-encryption key $rk_{A\rightarrow B}$=rekey($sk_A$,$pk_B$). This re-encryption function is one way, and $rk_{A\rightarrow B}$ cannot be decomposed into its component parts (at least, without also knowing $sk_A$ or $sk_B$). All it can do is to re-encrypt $\text{AsymCiphertext}_A$ such that it is transformed into $\text{AsymCiphertext}_B$=reencrypt($rk_{A\rightarrow B}$, $\text{AsymCiphertext}_A$).

A proxy server handles the re-encryption process that transforms ciphertexts under the delegator's public key into ciphertexts that the delegatee can decrypt using his private key. The proxy server uses the re-encryption key during this process, and does not learn any additional information. Alice sends AsymCiphertexty to a proxy server.

Bob can decrypt $\text{AsymCiphertext}_B$ using his private key $sk_B$.

A high-level process for re-encryption and delegation can include the following steps:

Generate a random key $sk_e$.

$$rk_{A\rightarrow e}=\text{rekey}(sk_A, sk_e)$$

$$sk_e'=\text{AsymEncrypt}_{pk_B}(sk_e)$$

$$rk_{A\rightarrow B}=(rk_{A\rightarrow e}, sk_e')$$

The re-encryption node uses $rk_{A\rightarrow e}$ to re-encrypt any ciphertext $\text{Ciphertext}_A$ (whose underlying message is M) so it can be decrypted by $sk_e$. The re-encryption process is as follows:

1. $\text{Ciphertext}_e=\text{ReEncrypt}_{rk_{A\rightarrow e}}(\text{Ciphertext}_A)$. 2. $\text{Ciphertext}_B=(\text{Ciphertext}_e,sk_e')$.

The decryption process is as follows:

1. $sk_e=\text{AsymDecrypt}_{sk_B}(sk_e')$

2. $M=\text{AsymDecrypt}_{sk_e}(\text{Ciphertext}_e)$

In a further embodiment, the file transfer methodology could also be adapted for use as a real time messaging system using blockchain. Messages that are sent over this system can be encrypted end to end on the client-side by default, then signed with the recipient's public address. As such, any messages sent over the system are encrypted and not readable by other parties. Messages can be transmitted through the INVN Blockchain. Parties can exchange messages (possibly with a new ID changing every time) via their public address on the blockchain. Instead of saving messages directly in the blockchain they could alternatively be treated as single-chunk files which are stored via the server 110 by the sender and transferred to the recipient to be read out.

To increase privacy, the application can generate a new Public Address for every new transaction. Multiple keys can be generated for each transaction to prevent or complicate the tracing of the transaction and reduce the potential for external threats. During the protocol executions, the participants can use short (also known as ephemeral) and long-term public and private key pairs. Forward secrecy protects all the past sessions, even if the long-term keys are compromised, providing an important security feature for secure communication that ensures the security of past sessions against future compromises of keys or passwords.

Other services in addition to sending and receiving encrypted messages, sending files to users, and check Block explorer for transaction ledger, may also be supported. The user app 132 communicates through a network, such as the Internet, with the main server software 140. It can also communicate with a management portal for access to various account settings. Admin users, such as Corporate Clients, can access system management features implemented on the server 110 such as for management of their users, backup controls and account limits, analytics, invoicing, service management, and customization of features.

The present methods and systems for storing, retrieving, and transferring files can be used in a variety of different applications and fields of use:

System Backups: Backups can include SQL servers, VMs, files, etc. All backups are initially encrypted with the user's private key, which is only available on their local device, then gets split into multiple parts and each part gets stored over a different storage node as done for files. Backup service in this manner can be used to help limit Ransomware and Database Attacks by encrypting and splitting database dumps and backing them up on various cloud providers, which providers can be selected by the client. Since small and medium enterprises often cannot afford fully Cybersecurity and Firewall Solutions, the present methods can be used as cost-effective solution for this market segment. Custom software plugins can be provided to provide backup options for databases including MySQL, Maria DB, Oracle databases, among others. Unlike conventional solutions that store critical backups in centralized data centers, use of the present systems and methods provides backups that are end-to-end encrypted, split into pieces, and distributed across a decentralized network. Even if files are corrupted or encrypted, restoring them from the designated architecture may quickly restore everything to its original state. Cloud backup files stored within this system distributed cloud network are exceptionally safe from direct modification by malicious ransomware code, which security is further enhanced by using end-to-end encryption and access tokens on all front-end, back-end, in-transit, and at-rest transmissions, and restricting access to file modification activities only to signed and authorized agent software. Moreover, a criminal would not be able to track cloud backups either since all data is end-to-end encrypted and gets transmitted through the blockchain-based decentralized network.

Data Governance: Within an organization, there might be various policies for different individuals to access data. Intellectual property, company financials, human resources evaluations, and customer data, i.e. should be classified and made available to individuals based on accessibility rights. Similarly, access rights can be revoked over time or due to various circumstances. Compartmentalization of data is best achieved by encrypting data using hierarchical deterministic keys and storing this data on clouds rather than storing copies of unencrypted data on local user computers.

The application can be implemented for use on conventional computer and smart device platforms, such as PCs, tablet devices, and smartphones, using suitable operating systems, such as Linux, OS X, and Windows. The various software features to implement the presently disclosed functions can be implemented using conventional programing languages and techniques know to those of ordinary skill in the art.

While the various software components in the client app 132 are shown as separate engines, the architecture and organization of the software components can vary and they can be implemented in a single program or functions divided among software engines in a different way. Likewise various core, administration, and client management functions performed on the server 110 can be implemented separately or in a single program.

The software for the client app 132 can be stored on a computer program product, such as a magnetic or optical disc or USB drive that can be distributed to a user and which, when loaded into a user device 105, will configure the user device 105 to perform methods as disclosed herein. The client app 132 could also be made available for download, such as from the server 110 or another source. Likewise, the software for the server 110 can be stored on a computer program product and from which the software can be loaded into the server to configure it to perform methods as disclosed herein. Server software could also be made available to the server by download.

Although preferred embodiments store data retrieval information in an INVN, such data could alternatively be stored in different manners, such as on conventional local, remote, or cloud storage systems or databases without, implicating the chunk storage and retrieval operations performed by the user device 105, server 110, and data storage nodes 115.

Various aspects, embodiments, and examples of the invention have been disclosed and described herein. Modifications, additions and alterations may be made by one skilled in the art without departing from the spirit and scope of the invention as defined in the appended claims.

The invention claimed is:

1. A method for distributed data storage of a file across a plurality of data storage nodes comprising the steps of:

in a networked computerized user device:

dividing the file into a plurality of chunks, wherein the chunks can be combined in a reassembly sequence to recreate the file;

requesting a plurality of slot allocations from the server;

receiving the plurality of slot allocations from the server; and assigning each of the plurality of chunks to a respective one of the allocated slots;

sending each respective chunk and the slot identifier allocated to the respective chunk to a server;

receiving from the server a respective chunk retrieval data item for each sent chunk; and storing file retrieval data in an independent node verification network ("INVN"), the file retrieval data comprising the chunk retrieval data item for each respective chunk and reassembly data sufficient to determine the reassembly sequence;

in the server:

receiving a respective chunk and associated slot identifier from the user device;

sending the received chunk to a particular data storage node in the plurality of data storage nodes and receiving in response from the particular data storage node a data retrieval address, wherein the particular data storage node is a data storage node identified by the slot identifier;

sending to the user device after successful storage of the received chunk at the particular data storage node the chunk retrieval data item for the received chunk, the chunk retrieval data item comprising the data retrieval address from the particular data storage node.

2. The method of claim 1, the chunk retrieval data item further comprising an ID for the particular data storage node, the ID for the particular storage node comprising the slot identifier associated with the respective chunk, the slot identifier uniquely mapping to the particular storage node.

3. The method of claim 1, the step of requesting a plurality of slot allocations from the server comprising requesting a number of slot allocations equal to the number of chunks in the plurality of chunks;

the user device being associated with a user ID;

the method further comprising the step in the server of:

generating the plurality of slot allocations, wherein the slot allocations are made in accordance with data storage node preferences associated with the user ID.

4. The method of claim 1, further comprising the step of, in the user device, encrypting the plurality of chunks before the step of sending each of the plurality of chunks to a server.

5. The method of claim 1, further comprising the step of, in the user device, encrypting the file retrieval data before the step of saving file retrieval data in the INVN.

6. The method of claim 1, wherein the step of sending each of the plurality of chunks to the server comprises sending the chunks to the server an order that is different from the reassembly sequence.

7. The method of claim 1, further comprising, in the server, the step of randomly selecting the particular data storage node from the plurality of storage nodes.

8. The method of claim 7, wherein the plurality of data storage nodes comprises a subset of a set of data storage nodes available to the server, the set of data storage nodes including a storage node not one of the plurality of data storage nodes;

the user device being associated with a user ID, the method further comprising the step of selecting the plurality of data storage nodes as a subset of the set of data storage node in accordance with user preferences associated with the user ID.

9. The method of claim 1, further comprising the step of in the user device generating a storage address, wherein the file retrieval data is stored in the INVN at the generated storage address.

10. The method of claim 1, further comprising the steps of, after the step of saving the file retrieval data in the INVN:

obtaining the file retrieval data for the file from the INVN;

extracting the plurality of chunk retrieval data items and the reassembly data from the retrieved file;

for each respective chunk retrieval data item, retrieving a respective chunk from the data storage node identified in the respective chunk retrieval data item using the data retrieval address in the respective chunk retrieval data item;

determining from the file retrieval data the reassembly sequence; and combining the retrieved data chunks in accordance with the reassembly sequence to recreate the file.

11. The method of claim 1, further comprising the steps of, in the user device after the step of saving the file retrieval data in the INVN:

obtaining the file retrieval data for the file from the INVN;

extracting the plurality of chunk retrieval data items and the reassembly data from the retrieved file;

sending each respective chunk retrieval data item, to the server and receiving in response from the server a respective retrieved data chunk for each respective chunk retrieval data item;

determining from the file retrieval data the reassembly sequence;

combining the retrieved data chunks received from the server in accordance with the reassembly sequence to recreate the file; and saving the file in an electronic storage of the user device.

12. The method of claim 11, further comprising the step of, in the server:

receiving a respective chunk retrieval data item from the user device;

retrieving a respective chunk from the data storage node identified by the received respective chunk retrieval data item using the data retrieval address from the INVN in the received respective chunk retrieval data item; and send the respective received chunk to the user device.

13. A system for distributed data storage of a file across a plurality of data storage nodes comprising:

a user device connectable to a network and comprising a user computer processor and user device electronic storage having user device software stored therein, the user computer processor operable to execute the user device software;

a server connectable to the network and the plurality of data storage nodes and comprising a server second computer processor and server electronic storage having server software stored therein, the server computer processor operable to execute the server software;

the user device and server operable to exchange messages and data over the network;

the user device software comprising instructions to configure the user computer processor to perform the steps of:

dividing the file into a plurality of chunks, wherein the chunks can be combined in a reassembly sequence to recreate the file;

requesting a plurality of slot allocations from the server;

receiving the plurality of slot allocations from the server; and assigning each of the plurality of chunks to a respective one of the allocated slots;

sending each respective chunk and the slot identifier allocated to the respective chunk to a server;

receiving from the server a respective chunk retrieval data item for each sent chunk; and storing file retrieval data in an independent node verification network ("INVN"), the file retrieval data comprising the chunk retrieval data item for each respective chunk and reassembly data sufficient to determine the reassembly sequence;

the server software comprising instructions to configure the server processor to perform the steps of:

receiving a respective chunk and associated slot identifier from the user device;

sending the received chunk to a particular data storage node in the plurality of data storage nodes and receiving in response from the particular data storage node a data retrieval address, wherein the particular data storage node is a data storage node identified by the slot identifier; and sending to the user device after successful storage of the received chunk at the particular data storage node the chunk retrieval data item for the received chunk, the chunk retrieval data item comprising the data retrieval address from the particular data storage node.

14. The system of claim 13, the chunk retrieval data item comprising an ID for the particular data storage node.

15. The system of claim 14, wherein the ID for the particular storage node comprises the slot identifier associated with the respective chunk, the slot identifier uniquely mapping to the particular storage node.

16. The system of claim 13, wherein the plurality of slot allocations requested from the server is equal to the number of chunks in the plurality of chunks.

17. The system of claim 13, wherein the user device is associated with a user ID, the server software further comprising instructions to configure the server to perform the step of generating the plurality of slot allocations, wherein the slot allocations are made in accordance with data storage node preferences associated with the user ID.

18. The system of claim 13, the user device software further comprising instructions to configure the user computer processor to encrypt the plurality of chunks before sending each of the plurality of chunks to a server.

19. The system of claim 13, the user device software further comprising instructions to configure the user computer processor to send each of the plurality of chunks to the server in an order that is different from the reassembly sequence.

20. The system of claim 13, wherein the plurality of data storage nodes comprises a subset of a set of data storage nodes available to the server, the set of data storage nodes including a storage node not one of the plurality of data storage nodes.

21. The system of claim 20, wherein the user device is associated with a user ID, the server software further comprising instructions to configure the server processor to select the plurality of data storage nodes as a subset of the set of data storage node in accordance with user preferences associated with the user ID.

22. The system of claim 13, the user device software further comprising instructions to configure the user computer processor to generate a storage address, wherein the file retrieval data is stored in the INVN at the generated storage address.

23. The system of claim 13, the user device software further comprising instructions to configure the user computer processor to perform the steps of:

obtaining the file retrieval data for the file from the INVN;

extracting the plurality of chunk retrieval data items and the reassembly data from the retrieved file;

for each respective chunk retrieval data item, sending to the server a request to retrieve respective chunk from the data storage node identified in the respective chunk retrieval data item using the data retrieval address in the respective chunk retrieval data item;

receiving from the server retrieved data chunks;

determining from the file retrieval data the reassembly sequence; and combining the retrieved data chunks in accordance with the reassembly sequence to recreate the file; and saving the file.

24. The system of claim 23, the server software further comprising instructions to configure the server computer processor to perform the steps of:

receiving a respective chunk retrieval data item from the user device;

retrieving a respective chunk from the data storage node identified by the received respective chunk retrieval data item using the data retrieval address from the INVN in the received respective chunk retrieval data item; and send the respective received chunk to the user device.

* * * * *